US012755166B2

(12) United States Patent
Xiong

(10) Patent No.: US 12,755,166 B2
(45) Date of Patent: Oct. 6, 2026

(54) OBJECT RECOGNITION METHOD AND APPARATUS, ELECTRONIC DEVICE AND STORAGE MEDIUM

(71) Applicant: Tencent Technology (Shenzhen) Company Limited, Shenzhen (CN)

(72) Inventor: Xiaoyu Xiong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 714 days.

(21) Appl. No.: 18/195,868

(22) Filed: May 10, 2023

(65) Prior Publication Data

US 2023/0281479 A1 Sep. 7, 2023

Related U.S. Application Data

(63) Continuation of application No. PCT/CN2022/114765, filed on Aug. 25, 2022.

(30) Foreign Application Priority Data

Sep. 22, 2021 (CN) .......................... 202111109153.6

(51) Int. Cl.
*G06N 5/022* (2023.01)

(52) U.S. Cl.
CPC .................................... *G06N 5/022* (2013.01)

(58) Field of Classification Search
CPC ...... G06N 5/022; G06N 20/00; G06F 18/214; G06F 18/241; G06F 18/2431; G06Q 20/40
See application file for complete search history.

(56) References Cited

U.S. PATENT DOCUMENTS

2020/0334501 A1 10/2020 Lin et al.

FOREIGN PATENT DOCUMENTS

CN 110688482 A 1/2020
CN 111444334 A 7/2020

(Continued)

OTHER PUBLICATIONS

Wang, Haobo, et al. "Collaboration based multi-label propagation for fraud detection." Proceedings of the Twenty-Ninth International Conference on International Joint Conferences on Artificial Intelligence. 2021. (Year: 2021).*

(Continued)

*Primary Examiner* — Sehwan Kim
(74) *Attorney, Agent, or Firm* — Morgan, Lewis & Bockius LLP

(57) ABSTRACT

Embodiments of this application provide an object recognition method performed by an electronic device. The method includes: obtaining relevant object data of target objects; predicting first labels of the various target objects by an object recognition model on the basis of the relevant object data of each target object; obtaining a reference data set comprising relevant object data and second labels of a plurality of first sample objects with annotation labels, and determining first association relationships between the target objects and the plurality of first sample objects; and obtaining recognition results of the target objects according to the first labels of the target objects, the annotation labels and second labels of the first sample objects, and the corresponding first association relationships.

18 Claims, 7 Drawing Sheets

(56) References Cited

FOREIGN PATENT DOCUMENTS

| | | | |
|---|---|---|---|
| CN | 112115957 | A | 12/2020 |
| CN | 112818826 | A | 5/2021 |
| CN | 112989055 | A | 6/2021 |

OTHER PUBLICATIONS

Ye, Chang, et al. "GPU-accelerated graph label propagation for real-time fraud detection." Proceedings of the 2021 International Conference on Management of Data. 2021. (Year: 2021).*

Liu, Yang, et al. "Pick and choose: a GNN-based imbalanced learning approach for fraud detection." Proceedings of the web conference 2021. 2021. (Year: 2021).*

Tencent Technology, WO, PCT/CN2022/114765, Oct. 13, 2022, 3 pgs.

Tencent Technology, IPRP, PCT/CN2022/114765, Mar. 26, 2024, 4 pgs.

Tencent Technology, ISR, PCT/CN2022/114765, Oct. 13, 2022, 2 pgs.

* cited by examiner

OBJECT RECOGNITION METHOD AND APPARATUS, ELECTRONIC DEVICE AND STORAGE MEDIUM

CROSS-REFERENCE TO RELATED APPLICATIONS

This application is a continuation application of PCT Patent Application No. PCT/CN2022/114765, entitled "DATA PROCESSING METHOD, COMPUTER DEVICE, AND STORAGE MEDIUM" filed on Aug. 25, 2022, which claims the priority of Chinese patent application No. 202111109153.6, filed on Sep. 22, 2021 with the China National Intellectual Property Administration and entitled "OBJECT RECOGNITION METHOD AND APPARATUS, ELECTRONIC DEVICE AND STORAGE MEDIUM", both of which is incorporated herein by reference in its entirety.

FIELD OF THE TECHNOLOGY

This application relates to the technical field of mobile payment, payment security, big data, vehicle-mounted terminals, artificial intelligence, and the like. Particularly, this application relates to an object recognition method and apparatus, an electronic device and a storage medium.

BACKGROUND OF THE DISCLOSURE

With the rapid development of science and technology, online payment, transfer and the like are very common in people's lives. While science and technology bring convenience to the life, forms and means of network frauds are emerging in endlessly. How to effectively prevent and avoid various commercial frauds and recognize fraudulent users is always one of the important problems that related technical personnel research.

SUMMARY

Embodiments of this application provide an object recognition method performed by an electronic device, the method including:

obtaining relevant object data of a target object;

predicting a first label of the target object by an object recognition model on the basis of the relevant object data of the target object, the first label representing an object type among a plurality of object types;

obtaining a reference data set, the reference data set comprising relevant object data and second labels of a plurality of first sample objects with annotation labels, the annotation label of one first sample object representing a real object type among the plurality of object types, and the second label of the first sample object representing a probability that the first sample object belongs to each of the plurality of object types;

determining first association relationships between the target object and the plurality of first sample objects according to the relevant object data of to the target object and the relevant object data of the plurality of first sample objects;

determining a second label of the target object according to the first label of the target object, the annotation label and second label and the corresponding first association relationship of each of the plurality of first sample objects; and determining a recognition result of the target object according to the second label of the target object.

The embodiments of this application further provide an electronic device, including a memory, a processor, and a computer program stored on the memory. The processor executes the computer program and causes the electronic device to perform the steps of the method provided by the embodiments of this application.

The embodiments of this application also provide a non-transitory computer-readable storage medium, storing a computer program that, when executed by a processor of an electronic device, causes the electronic device to perform the steps of the method provided by the embodiments of this application.

The embodiments of this application further provide a computer program product or a computer program, the computer program product or the computer program including computer instructions stored in a computer-readable storage medium. The processor of the computer device reads the computer instructions from the computer-readable storage medium, and executes the computer instructions, so that the computer device implements the method provided by the embodiments of this application.

BRIEF DESCRIPTION OF THE DRAWINGS

To describe the technical solutions in embodiments of this application more clearly, the following briefly describes the accompanying drawings used for describing the embodiments of this application.

DESCRIPTION OF EMBODIMENTS

Figure 1:
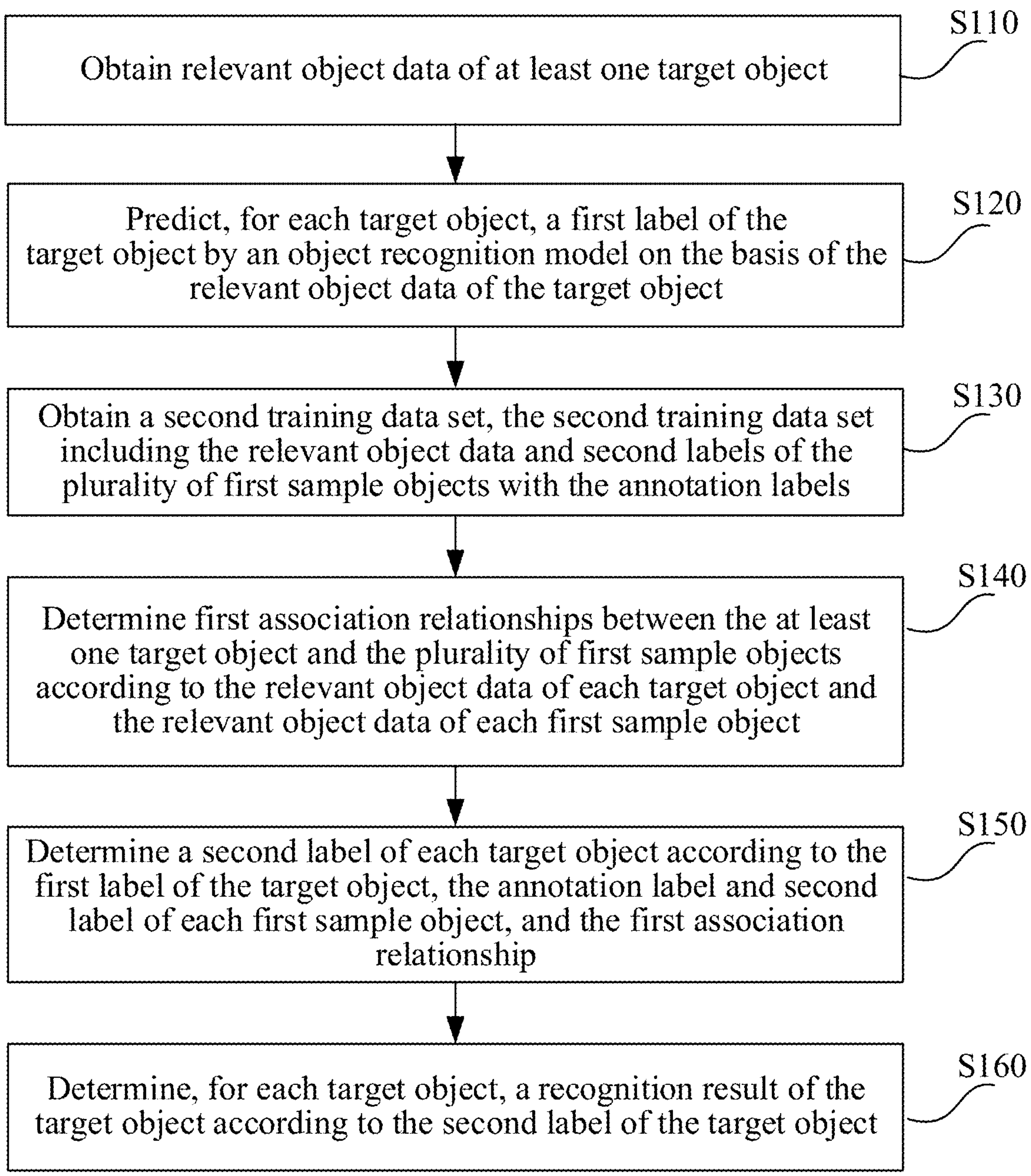
FIG. 1 is a flowchart of an object recognition method provided by an embodiment of this application.

Embodiments of this application are described below in conjunction with the accompanying drawings in this application. It is understood that the implementations set forth below in connection with the accompanying drawings are exemplary descriptions for explaining technical schemes of the embodiments of this application and are not limiting the technical schemes of the embodiments of this application.

Those skilled in the art can understand that, unless specifically stated, the singular forms "a/an", "one", "said", and "the" used here may also include plural forms. It should be further understood that the terms "including" and "include" used in the embodiments of this application refer to corresponding features that can be implemented as presented features, information, data, steps, operations, elements, and/or components, but do not exclude implementation of other features, information, data, steps, operations, elements, components, and/or combinations thereof supported in the art. It is understood that one element is referred to as "connected" or "coupled" to another element, the element can be directly connected or coupled to another element, or it can refer to a connection relationship established between the element and another element through an intermediate element. In addition, the term "connection" or "coupling" used here can include wireless connection or wireless coupling. The term 'and/or' used here indicates at least one of the items limited by the term, including all or any unit and all combinations of one or more associated listed items. For example, "A and/or B" indicates implementation as "A", or "A", or "A and B".

To make the objectives, technical solutions, and advantages of this application clearer, the following further describes implementations of this application in detail with reference to the accompanying drawings. In order to better understand the related art, some technical terms involved in this application are firstly introduced:

This application is a method for recognizing an object (namely, an object having a fraud risk (referring to a transaction risk that a dark industry illegally obtains user's assets by induction, false information and the like)) provided to better meet a risk recognition requirement, to solve the problems in a manner for recognizing a target type of object (such as a risk object, namely, a fraudulent object/user, referring to a user earning profits with illegal means/means violating the social morality). At present, a risk user is often recognized by loss reporting by other users, or is often recognized by user's own transaction behaviors. User risk labels (marks of fraudulent users) are separated from one another. During recognition of a fraud risk, an association risk with other users or merchants is recognized by only use of a single user risk label. In previous practice, users only act as a medium for single risk transmission, and the maintenance of user labels is costly, time-consuming and labor-intensive. There are at least the following problems in relevant risk object recognition manners:

1) Poor timeliness: In the whole life cycle of a black industry (illegal industry/malicious industry, referring to an industry that makes profits with illegal means/means violating the social morality), the black industry often commits fraud in batches during the same period. Depending on a recognition manner based on loss reporting by other users, when one risk user is marked, merchants in the same period are likely to have completed the entire fraud process, and a large number of loss reports occur, which cannot be prevented in advance and greatly affects the control of the fund of the black industry.

2) Insufficient coverage rate: At present, most frauds are based on an Internet technology. The registration cost of an account is almost 0. In order to carry out fraudulent transactions and transfer funds more quickly and efficiently, a black industry often have a large number of accounts. However, schemes that recognize risk users depending on customer complaints and affiliated black merchant (fraudulent merchants) have great limitation, and cannot comprehensively cover black industry accounts.

3) Low relevance. Constructions of relevant user risk labels are often independent from each other according to different service scenes. Although clue sources are different during user risk recognition, it can be found through a large number of practices that different risk users may work in different procedures of the same fraud case, and different risk users also have subtle contacts such as social information and transaction behaviors. However, relevant recognition manners cannot achieve relevance recognition in different service scene.

In order to solve at least one of the problems existing in the related art, to better meet the requirements of risk recognition, this application provides a new object recognition method, based on which, a risk user relationship network can be created, which not only helps to construct a user risk system, but also makes the life cycle of a black industry clearer, to provide a new path for pre-recognition of fraud risks.

In some embodiments, the object recognition method provided by the embodiments of this application can better meet the requirements for timeliness and coverage rate of object recognition. The method can be applied to processing of big data, and can be implemented, for example, on the basis of a cloud technology. Data computing involved in the embodiments of this application may adopt a cloud computing method. For example, steps of training an object recognition model, determining a label of an object on the basis of label propagation, and the like may adopt cloud computing.

Big data refers to data sets that cannot be captured, managed and processed by conventional software tools within a certain time range, and are massive, high-growth-rate and diversified information assets that have stronger decision-making power, insight discovery power, and process optimization capability in a new processing mode. With the advent of cloud era, big data has attracted more and more attentions. Big data requires a special technology to effectively process a large amount of data within tolerable elapsed time. Technologies suitable for big data include massively parallel processing databases, data mining, distributed file systems, distributed databases, cloud computing platforms, Internets, and extensible storage systems. A cloud technology is a general name of a network technology, an information technology, an integration technology, a management platform technology, an application technology and the like applied on the basis of a cloud computing business mode, can form a resource pool for on-demand use, and is flexible and convenient. A cloud computing technology will become an important support.

In some embodiments, the scheme provided by the embodiments of this application can also be implemented on the basis of an artificial intelligence (AI) technology. For example, a first risk label of an object can be predicted by a trained risk recognition model, and a reference data set can be obtained on the basis of a loss function in a manner of machine learning. The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning.

In some embodiments, storage of data (such as relevant object data of an object) involved in the embodiments of this application can adopt cloud storage or block chain-based storage, which can effectively protect the security of the data. Block chain is a novel application mode of computer technologies such as distributed data storage, peer to peer transmission, a consensus mechanism, and an encryption algorithm. The block chain is essentially a decentralized database and is a string of data blocks generated through association by using a cryptographic method. Each data block includes information of a batch of network transactions, the information being used for verifying the validity of information of the data block (anti-counterfeiting) and generating a next data block. The block chain may include a block chain underlying platform, a platform product services layer, and an application services layer.

The technical schemes of the embodiments of this application and the technical effects achieved by the technical schemes of this application are described below by describing several exemplary implementations. The following implementations may be referred to or combined with each other, and the description of the same terms, similar features, and similar implementation steps in different implementations will not be repeated.

FIG. 1 shows a flowchart of an object recognition method provided by an embodiment of this application. The method may be implemented by any electronic device. For example, the method may also be implemented by a server, and the server may be a cloud server, a physical server, or a server cluster. The method may be implemented as an application program or as a plug-in or functional module of an existing application program. For example, the method may be used as a newly added functional module of a transaction class (such as mobile payment) application program, and the server of the application program may implement the method of this embodiment of this application to recognize a label of a target object, and recognize whether the target object is an object of a target type, such as whether it is a non-risk object, and a risk type to which the risk object belongs (the object type indicates which kind of fraudulent behavior that the object has). The method may also be implemented by a terminal device. By implementing the method, the terminal device can recognize a label of a target object and obtain a recognition result. The terminal device includes a user terminal, and the user terminal includes but is not limited to a mobile phone, a computer, an intelligent voice interaction device, an intelligent household appliance, a vehicle-mounted terminal, and the like. In some embodiments, in practical applications, the method may be performed by a server in order to better ensure the security of object information.

As shown in FIG. 1, the object recognition method provided by this embodiment of this application may include step S110 to step S140.

Step S110: Obtain relevant object data of at least one target object.

The object in this embodiment of this application may include but is not limited to a user, a merchant, and the like. One object may be represented by an object identifier. The form of the object identifier is not limited in this embodiment of this application, as long as it can uniquely represent information of one object, such as including but not limited to contact information of the object, an account identifier of the object, and the like. The account identifier of the object may be a social account of the object, such as an account of the object in an application program (for example, a registered account name, nickname, and the like of a user in the application program). For convenience of description, in some embodiments described later, an account of one object may be used to represent the object.

In this embodiment of this application, relevant object data of one object includes interaction data of the object. The relevant object data may be interaction behavior data (also referred to as social behavior data) of the object, which refers to data related to the social behaviors of the object, and may particularly include data related to interaction behaviors of the object with other objects. In practical applications, specific using which social behavior data may be configured as desired. Relevant object data may be social behavior data of an object obtained under the permission of the object.

In some embodiments, the social behavior data for one object may include social/interaction information and transaction information of the object. The social information reflects a social degree of the object. For example, the social information may include a social activity of the object, such as the number of friends of the object, the number of other objects following the object, the number of objects that transfers the information and give lives to the information when the object posts a piece of information, or the like. This embodiment of this application does not limit determining a friend. Two objects following each other can be friends. The transaction information of one object refers to relevant information of transactions occurring between the object and other objects. The transaction information may include but is not limited to payment behavior information, transfer information (including payment/transfer of the object to other objects, and also including payment/transfer of other objects to the object), and the like. The transaction information of one object may specifically include but is not limited to transaction time, an initiator and a receiver of a transaction (for example, when A transfers money to B, A is an initiator, and B is a receiver), a transaction amount, and a transaction type (whether it is a transfer or a red packet, or other forms).

Step S120: Predict, for each target object, a first label of the object by an object recognition model on the basis of the relevant object data of the object, the first label of one object representing an object type, to which the object belongs, among a plurality of object types.

The object type may also be referred to as a risk type, referring to a type of a fraudulent behavior of one object. The first label, which may also be referred to as a first risk label, represents a risk type of the object predicted on the basis of the relevant object data of the object.

The object recognition model (which may also be referred to as a risk recognition model) is a neural network model that has been pre-trained on the basis of a training data set. An input of the model is the relevant object data of an object, or data obtained after the relevant object data is preprocessed, and an output of the model is an object type corresponding to the relevant object data. For example, the relevant object data can be preprocessed into data of a fixed format according to a preset requirement. For example, after being converted into a vector of a specified data format, the data is inputted to the model, and the object type of the object is obtained through model prediction.

In this embodiment of this application, the object recognition model may be a classification model. The classification model may be a multi-class model. Each of the plurality of object types corresponds to one class of the classification model. A corresponding class of the social behavior data may be predicted by the model; and the object type represented by the class is the object type of the object to which the social behavior data belongs. In practical applications, this embodiment of this application does not limit the data form of the output of the model. For example, the output may be an identifier of a class, or may be a one-dimensional vector. The number of elements (namely, digits) in the vector is equal to the total number of the above plurality of object types, and each element corresponds to one type. An element value of each element may be 0 or 1. For example, the element value of only one element is 1, and the element values of other elements are all 0. The type corresponding to the element with the value of 1 is the predicted type of the object, namely, the above first label.

In addition, in practical implementations, the above various object types may include various target types and a non-target type. Each target type corresponds to a fraudulent behavior type, namely, a risk type, and the non-target type corresponds to a non-risk user without a fraudulent behavior. That is, no risk can also be taken as a risk type. If the risk type predicted by the model is no risk, an initial recognition result of the object indicates that the object is not a risk object. For example, if there are two object types, a type A and a type B (namely, two target types), the object recognition model can be a three-class model which can predict whether an object belongs to the type A, the type B or the non-risk type (non-target type).

This embodiment of this application does not limit a specific training manner for the object recognition model. The aforementioned training end condition for the model may also be configured according to application requirements.

In this embodiment of this application, the object recognition model may be trained by:

- obtaining a first training data set, the first training data set including relevant object data of a plurality of second sample objects with annotation labels and relevant object data of a plurality of unlabeled third sample objects, and real object types of the plurality of second sample objects including each of the plurality of object types;
- training an initial classification model on the basis of the relevant object data of the plurality of second sample objects, and obtaining a first classification model until a first training end condition is satisfied;
- predicting, for each third sample object, an object type of the third sample object through the first classification model on the basis of the relevant object data of the third sample object, and determining an annotation label of the third sample object according to the object type; and
- continuously training the first classification model on the basis of the relevant object data of the plurality of second sample objects and the relevant object data of the plurality of third sample objects with the annotation labels, and obtaining the object recognition model until a second training end condition is satisfied.

The objects perform different interaction behavior features (social behavior features) in different scenes. In order to ensure that a misjudgment caused by mutual interference between different types of objects in the process of model learning, in some embodiments of this application, during the training of the object recognition model based on the training data set, the model training is performed using training data of various different object types. That is, for each object type, the training data set includes relevant object data of a plurality of sample objects of the type, and the model can learn social behavior features of objects of different object types from the relevant object data of the sample objects of the different object types through training.

Further, since sample data with annotation labels is usually obtained manually, the number of pieces of the sample data is limited. In this embodiment of this application, model training is performed by means of semi-supervised learning, that is, the training data set contains sample data with annotation labels and sample data without annotation labels at the same time. During training of the model, in order to ensure the accuracy of model training, the model is iteratively trained by using the sample data with the annotation labels in the first stage of training, so that the trained model can meet certain performance requirements, namely, satisfy a first training end condition. The condition can be configured according to actual requirements. For example, the prediction accuracy of the model is greater than a set value. At this time, an object type corresponding to the sample data without annotation labels can be predicted via the model. The relevant object data of the third sample objects can be inputted to the first classification model satisfying the above first training end condition to obtain the first label of each third sample object, and this label is used as an annotation label (namely, a pseudo label) of the third sample object. The model can continue to be trained on the basis of the sample data with the annotation labels and the sample data with the pseudo labels. When the model achieves an expected effect, the training can end, and the object recognition model meeting the application requirements can be obtained. The first labels of the target objects can be preliminarily predicted by the model.

Step S130: Obtain a reference data set, the reference training data set including the relevant object data and second labels of the plurality of first sample objects with the annotation labels.

The annotation labels of the first sample objects represent the real object types, to which the objects belong, among the various object types, and the second label of one object represents a probability that the object belongs to each of the plurality of object types.

For ease of understanding, as an example, assuming that the various object types include five types. The annotation label of one object may be represented as [1, 0, 0, 0, 0], and the second label may be represented as [p1, p2, p3, p4, p5], where p1 to p5 respectively represent probabilities that the object belongs to each of the five object types. A sum of the five probabilities is equal to 1. The annotation label represents that the real object type of the object is an object type, corresponding to an element having a value of 1, among the five object types.

The reference data set may be understood as a real sample data set including relevant data of a plurality of objects of known risk types, including relevant object data, annotation labels and second labels.

In this embodiment of this application, for each first sample object, the annotation label and the second label of the first sample object can be both understood as real labels of the object. The second label can be understood as a probability distribution that the sample object belongs to each of various object types when a real object type of the sample object is an object type corresponding to the annotation label.

In practical applications, the implementation of a fraudulent behavior often involves a plurality of different procedures, and may involve a plurality of different risk users (namely, risk users/objects). Throughout the life cycle of the fraudulent behavior, different risk users may also work in different procedures of the same fraudulent behavior, and different risk users also have subtle contacts such as social information and transaction behaviors. Therefore, risk users of one type are likely to have a connection with risk users of the same type or different types, and users of different risk types may also have a propagation and may affect each other. Therefore, in this embodiment of this application, the annotation label and the second label are used to respectively reflect, from two different levels, an object type of a user itself and a possibility that the user belongs to each object type in a case of considering the connection between the user and other users. That is, the second label is a risk label in a case of considering the mutual impact between the users. This embodiment of this application does not limit a specific obtaining manner of the reference data set.

Step S140: Determine first association relationships between the at least one target object and the plurality of first sample objects according to the relevant object data of each target object and the relevant object data of each first sample object.

Step S150: Determine a second label of each target object according to the first label of each target object, the annotation label and second label of each first sample object, and the first association relationship.

Step S160: Determine, for each target object, a recognition result of the target object according to the second label of the target object.

The above first association relationships between at least one target object and the various objects in the plurality of first sample objects include association relationships between the target objects and association relationships between the target objects and the first sample objects. The association relationship may also be referred to as a social association relationship or an interaction association relationship.

Since the relevant object data of one object contains interaction data of the object with another object, a social association relationship between the objects can be determined according to the relevant object data of the two objects. This embodiment of this application does not limit a granularity of division of association relationships. In some embodiments, the association relationships between the objects may include that there are association relationships or is no association relationship between the objects. Different types of association relationships may be further subdivided. For example, the relevant object data may have various different types, and whether there is an association relationship corresponding to this type between objects may be determined according to the relevant object data of each type.

In some embodiments, the relevant object data of one object may include various different types of data, such as transfer information of the object, red packet (sending red packets or receiving red packets) information, and entity information corresponding to the object. The entity information refers to entity information applied by the object for a social behavior, for example, contact information of the object, a transaction account (such as a bank card number and a virtual resource account). It can be determined, according to the transfer information of the objects, whether there is an association relationship corresponding to this type of behavior data between the objects, and it can be determined whether there is a corresponding association relationship between the objects according to the red packet information of the objects object. That is, one type of behavior data may correspond to one type of association relationship. Of course, in practical applications, type division may not be performed on the association relationships. Whether there is an association relationship between the objects may be determined on the basis of various types of relevant object data of the objects. For example, if either type of relevant object data of two objects indicates that there is an association relationship between the two objects, it may be determined that there is an association relationship between the objects.

In practical applications, since the social association relationship between objects may have influence on attribute information of the objects, in the field of risk recognition, if an object A is a risk object, for example, an object having a fraudulent behavior, and another ordinary object B (a non-risk object) has an association with the object A (for example, a payment behavior occurring therebetween), the object B may also become an object having a potential risk, namely, the risk would be propagated due to the interaction information between the objects. In view of this, according to this scheme provided by this embodiment of this application, during the determining the recognition results of the target objects, the association relationships between the objects are further considered, so that the accuracy and comprehensiveness of object recognition can be improved.

The object recognition method provided by this embodiment of this application considers the social behavior data of the target object itself and the social association relationships between the object and other objects at the same time during the recognition of unknown target objects with or without risks. Since the social behavior data reflects social features between the object and other objects, the social features of a risk object and the social features of a non-risk object are usually different, and the social features of objects belonging to different risk types are also usually different. The risk type of the target object may be preliminarily assessed on the basis of social behavior data of the object. Further, since the social relationship between an object and another object will have an impact on the object, in particular, since a risk object will have an impact on an object having an association relationship therewith, by further considering the social association relationship between the objects and the risk labels (namely, the first risk label of the target object and the annotation label and the second risk label of the first sample object) of the objects, the mutual impact between the objects can be integrated to the first risk label of the object predicted on the basis of the social behavior data of the target object, to determine a more accurate second risk label of the target object, thereby obtaining a risk assessment result of the object is obtained on the basis of this label.

In addition, since the method provided by this embodiment of this application can achieve automatic recognition of the target object on the basis of the reference data set and the relevant object data of the target object, without depending on loss reporting of other objects, the object can be assessed if required. Therefore, the requirement for timeliness in practical applications can be better met, and risk objects can be predicted, namely, recognized, in advance, so that corresponding prevention can be performed on the basis of the recognition result. For example, if an object is recognized to be a risk object, risk warning can be made when other objects conduct a transaction with the object, to prevent other objects from being induced into a fraud trap. The risk object can also be correspondingly controlled, or the recognized risk object can also be further tracked and verified by manual means, to prevent and fight against the risk object. Furthermore, during risk assessment, the method of this embodiment of this application can more comprehensively implement risk assessment on objects by virtue of the association relationships between the objects, and can effectively expand a coverage range of risk object assessment.

After the second label of the target object is obtained, the recognition result of the object can be determined on the basis of the label. The recognition result may include: whether the object is a risk object, namely, whether it is an object of a target type; and when the object is a risk object, which type or object types of the object. Or, the second label may be directly taken as the recognition result of the target object, and probabilities that the object belongs to the various object types can be obtained by the label. In some embodiments, an object type, corresponding to a probability greater than or equal to a set threshold, in the second label may be determined as the object type of the target object, or an object type corresponding to a maximum probability may be determined as the object type of the target object. If the object type with the maximum probability indicates no risk, it can be considered that the object is a non-risk object, namely, belongs to a non-target type. Of course, later tracking judgment can also be continued to be performed on the non-risk object.

In some embodiments of this application, the above determining a second label of each target object according to the first label of each target object, the annotation label and second label of each first sample object, and the first association relationship may include:

taking the first label of each target object as an annotation label and an initial second label of the target object, performing at least one label propagation between the target object and the first sample object on the basis of the first association relationship according to the annotation label and second label of each target object and the annotation label and second label of each first sample object, and obtaining an updated second label of each target object and an updated second label of each first sample object; and fusing, for each target object according to the first association relationships, the updated second labels of the various objects having the first association relationships with the target object, to obtain the second label of the target object.

In this embodiment of this application, the second label of the target object can be obtained by means of label propagation. Since the objects having the association relationships affect each other, if an object is a risk object, the risk type, namely, the label, of the object is also likely to be propagated to another object having an association relationship with the object, that is, the possibility that another object having the association relationship with the object is a risk object is relatively high. Therefore, on the premise that all the objects have their own labels (the first labels of the target objects, and the annotation labels and second labels of the sample objects), at least one label propagation can be performed on the basis of the association relationships between the objects. For each target object, the second label of the object can be obtained by fusing the labels of the various objects (including the sample objects and the target objects) having the association relationships with the target object.

The label propagation algorithm is a graph-based semi-supervised learning method, which propagates label information along a behavior path on the basis of the information transmissibility of a knowledge mapping. The basic idea of the label propagation algorithm is to use label information of labeled nodes to predict label information of unlabeled nodes, and labels of the nodes are transmitted to other nodes according to similarities between the nodes. In some embodiments of this application, the label propagation algorithm is optimized. For the target objects, the first labels of the target objects will be first predicted on the basis of the relevant object data of the target objects. On this basis, risk labels between the objects are propagated on the basis of the association relationships between the objects, namely, the risk label of one object can be propagated to another object having the association relationship with the object. The number of label propagations can be configured according to application requirements.

Each label propagation includes the following operations:

updating, for each of the target object and the first sample object, the second label of the object according to the first association relationship on the basis of the second labels of the various objects having association relationships with the object; and fusing, for each object, an updated second label of the object with the annotation label of the object to obtain an updated fifth label of the object, and taking the fifth label of the object as a second label of the object in next label propagation.

Assuming that the number of label propagation is one, for each of the above at least one target object and the plurality of first sample objects, the second label of the object can be updated according to the second labels of the various objects having the association relationships with the object. For example, the second labels of the various objects having the association relationships with the object can be fused (for example, standardized processing is performed after adding) to obtain an updated label, and the updated label is then fused with a label (for example, the first risk label/annotation label) of the object type to which the updated label belongs, to obtain a fused label of the object, that is, the updated fifth label of this label propagation. For each target object, the fused fifth labels of the various objects having the association relationships with the target object are fused, to obtain the second label of the target object.

If the number of label propagation is greater than 1, the above operations can be performed again on the basis of the second labels of the various objects (including the target object and the first sample objects) obtained last time, and the second label of the target object obtained in the last propagation is taken as the final second label.

In this embodiment of this application, the relevant object data includes at least one type of relevant object data, and the first association relationship includes a type of association relationship corresponding to each type of relevant object data.

Correspondingly, the above determining a second label of each target object according to the first label of each target object, the annotation label and second label of each first sample object, and the first association relationship includes:

obtaining a weight corresponding to each type of association relationship; and determining the second label of each target object according to the first label of each target object, the annotation label and second label of each first sample object, each type of association relationship, and the weight corresponding to each type of association relationship.

In this embodiment of this application, the association relationship corresponding to each type of relevant object data according to the types of the relevant object data, so as to more finely measure whether an object has association relationships with other objects in various social activities, to more accurately and comprehensively represent the social association relationship of an object. The above specified type specifically includes which type(s), which can be configured according to requirements, and this embodiment of this application does not limit this. For example, the relevant object data may include various types of behavior data, and the specified type may be one or more of the various types. This embodiment of this application does not limit a specific division manner of the types of the relevant object data, and a division rule of various data types can be set according to actual requirements and application scenes.

However, in practical applications, different types of association relationships have different influence degrees, in order to more accurately assess the association relationships between the objects, each type of association relationship has its own corresponding weight. Therefore, the association relationships with different influence degrees play different impact roles in the risk object assessment, which further improves the accuracy of object recognition.

In this embodiment of this application, the method may further include:

determining, for each of the at least one target object and the plurality of first sample objects, an influence of the object according to the relevant object data; and Correspondingly, the above determining a second label of each target object according to the first label of each target object, the annotation label and second label of each first sample object, and the first association relationship includes:

determining the second label of each target object according to the first label of each target object, the annotation label and second label of each first sample object, the influences of each target object and each first sample object, and the first association relationship.

The influence of an object refers to an ability of the object to influence other objects, which represents the social ability of the object from one level. In practical applications, different objects usually have different influences. For example, the relevant object data includes transfer information. A user transferring money to more than 30 accounts clearly has a significant influence difference from a user transferring money to two accounts. The labels of the objects with different influences may have different possibilities of influencing other objects. Therefore, this embodiment of this application further considers the influence of each object, to more accurately assess the second label of the target object.

In some embodiments, during the determining the second label of the target object on the basis of the label propagation, in each label propagation process, the influence of each object is used to weight the label of the object. For example, if one label propagation is performed, for each of the target object and the first sample object, the influence of the object can be used to weight the second label (the initial second label, namely, the first risk label, for the target object) of the object, and one label propagation is then performed on the basis of a weighted label. If multiple label propagations are performed, the second label of the object obtained by the last propagation may be weighted before each label propagation.

In some embodiments, the relevant object data of an object includes at least one type of relevant object data. The first association relationship includes a type of association relationship corresponding to each type of relevant object data. The influence of each of the at least one target object and the plurality of first sample objects includes an influence of each object corresponding to each type of association relationship.

That is, during classification processing of the relevant object data, the influence corresponding to each type of relevant object data can be determined respectively according to the types of the relevant object data, thereby more finely measuring the influence of an object in various social behaviors, to more accurately and comprehensively represent the influence of an object.

In some embodiments, for each object, the final influence of the object may be obtained by fusing the influences of the object corresponding to the various types, for example, the influences corresponding to the various types may be multiplied.

In some embodiments of this application, the method may further include:

determining a proportion of the number of objects of each object type of the at least one target object and the plurality of first sample objects according to the first label of each target object and the annotation label of each first sample object, the proportion of the number of objects including a ratio of the number of objects of each object type to the total number of the at least one target object and the plurality of first sample objects.

Correspondingly, the above determining a second label of each target object according to the first label of each target object, the annotation label and second label of each first sample object, and the first association relationship includes:

taking the proportion of the number of objects of each object type as a weight, weighting the first labels of the corresponding object type of the at least one target object, and weighting the annotation labels of the corresponding object type of the plurality of first sample objects; and determining the second label of each target object according to a weighted first label of each target object, a weighted annotation label and a weighted second label of each first sample object, and the first association relationship.

For the above target objects and the second sample objects, each object has its corresponding object type, namely, the first label of each target object and the annotation label of each second sample object. Magnitudes of objects under different object types are usually different. For a certain object type, a larger magnitude of the number of objects belonging to this object type indicates a higher possibility that the label of the object type is propagated to the target object. Therefore, in some embodiments of this application, during the determining the second label of the target object, the proportion of the number of objects of each object type is further considered, and the object labels (the first label of the target object and the annotation label of the second sample object) of the corresponding object type are weighted according to the proportion, so that the influence ability of the object label is in positive correlation with the number of objects of the corresponding object type, which is more in line with the actual situation, to more accurately predict the second label of the target object.

In some embodiments, in the processing manner based on label propagation, the object labels of the target objects and the first sample objects of the corresponding object type may be weighted according to the number of objects of each object type during each label propagation.

In this embodiment of this application, the reference data set may be obtained by:

obtaining a second training data set, the second training data set including the relevant object data of the plurality of first sample objects with the annotation labels;

determining second association relationships between the various first sample objects in the second training data set according to the relevant object data of each first sample object; and taking the annotation label of each first sample object as an initial third label of the first sample object, repeatedly performing the following operations until updated third labels of the plurality of first sample objects satisfy a preset condition, and determining that the third label of each first sample object when the preset condition is satisfied is the second label of the first sample object:

obtaining, on the basis of the second association relationships and the annotation labels and third labels of the various first sample objects, an updated fourth label of each first sample object by performing label propagation between the plurality of first sample objects; and fusing, for each first sample object according to the second association relationships, the fourth labels of the various first sample objects having the association relationships with the first sample object, to obtain a new third label of the first sample object.

As can be seen from the foregoing description, labels will be propagated between different objects. If there is a social behavior that has occurred between objects, particularly some specific types of social behaviors related to a fraudulent behavior, such as transfer and payment, the risk labels of the objects are likely to be propagated to the objects interacting therewith. In order to better learn the propagation influence between the labels of different objects, to predict the second labels of the target objects, in some embodiments of this application, based on a large number of the sample objects with the annotation, considering the mutual influences (namely, the association relationships between the objects and the annotation labels of the sample objects) between the objects, the labels of the objects are updated by performing label propagation between the objects; when the preset condition is satisfied, the final updated label of each object is obtained on the basis of the result of the label propagation; and the labels are used as the second labels of the sample objects. When the annotation labels of the objects are known, the final labels are the updated in a case of fusing the influences of the label propagation between different objects, so that the label propagation between the objects can be performed on the basis of the annotation labels and second labels of these sample objects and the association relationships between the target objects and these sample objects when the first labels (which can be understood as the initial annotation labels of the target objects) of the target objects have been predicted, to further determine the second labels of the target objects. For the specific operation of each label propagation, refer to the foregoing corresponding description, and detailed descriptions will not be made here.

In some embodiments of this application, after each label propagation, the method further includes:

obtaining newly added data, the newly added data including relevant object data of at least one fourth sample object with an annotation label;

taking each fourth sample object in the newly added data as a newly added first sample object in the second training data set, to update the second training data set; and determining a second association relationship between the various first sample objects in an updated second training data set according to the relevant object data of each first sample object in the updated second training data set, to obtain an updated second association relationship.

Correspondingly, the above obtaining, on the basis of the second association relationships and the annotation labels and third labels of the various first sample objects, an updated fourth label of each first sample object by performing label propagation between the plurality of first sample objects includes:

taking the annotation label of each newly added first sample object as the third label of the first sample object, and obtaining, on the basis of the updated second association relationships and the third labels of the various updated first sample objects, the fourth label of each updated first sample object by performing label propagation between the plurality of updated first sample objects.

In order to improve the generalization ability of learning, when learning the label propagation influence between the sample objects, the training data set can be updated after each label propagation by adding the new sample data, namely, the newly added data, so that the number of pieces of sample data is increased; and the association relationships between more objects are integrated, so that the results of the risk labels of the sample objects obtained by learning have higher universality.

In some embodiments of this application, the annotation labels of the various sample objects in the newly added data are obtained by:

obtaining relevant object data of at least one unlabeled fourth sample object; and predicting, for each fourth sample object among the at least one unlabeled fourth sample object, the first label of the fourth sample object through the object recognition model on the basis of the relevant object data of the fourth sample object, and taking the first label of the fourth sample object as the annotation label of the fourth sample object.

In practical applications, the newly added data may be relevant object data of a manually annotated sample object, and may be social behavior data of a risk object reported by an object. Considering a labor cost and a data amount of the newly added data, in some embodiments of this application, the annotation label of the newly added data may be the first label predicted by the trained object recognition model, and the label is used as the annotation label.

In some embodiments of this application, the method may further include:

determining similar object pairs among the plurality of first sample objects on the basis of the relevant object data of the plurality of first sample objects;

where the preset condition is satisfied, which includes that a value of a loss function satisfies a set condition; and the loss function includes a first loss function and a second loss function. For each label propagation, a value of the first loss function represents differences between the annotation labels and the new third labels of the various first sample objects, and a value of the second loss function represents differences between the new third labels of the various similar object pairs.

In some embodiments, the differences between the updated labels of the sample objects and the annotation labels of the sample objects can be constrained to be as small as possible through the first loss function, and the updated labels between the similar sample objects can be constrained to be as similar as possible by the second loss function. By this scheme, the label propagation learning can have good accuracy and generalization ability, to better meet application requirements. In some embodiments, during the determining the similar object pairs, whether two objects are similar can be determined according to specific types of relevant object data in the relevant object data of the objects. If a similarity between the specific types of relevant object data of the two objects is greater than a set value, it can be considered that the two objects form a similar object pair. The specific type may be specifically a specific type or several specific types, and this embodiment of this application does not limit this. The specific type can be configured according to actual requirements, for example, the specific type may be transfer data of the object.

According to the scheme provided by this embodiment of this application, during the recognition of each target object, the relevant object data of the target object itself and the association relationship between the object and another object are considered at the same time. Since the relevant object data of an object reflects features of the object, and objects of different object types usually have different features, the object type of the object can be preliminarily assessed on the basis of the relevant object data of the target object. However, the association relationship between an object and another object will have an influence on the object. Therefore, in the method of this embodiment of this application, the association relationships between the objects and the labels (namely, the first label of the target object and the annotation labels and second labels of the first sample objects) of the various objects are further considered, so that the mutual influence between the objects can be integrated with the first label of the target object predicted on the basis of the relevant object data of the target object, thereby obtaining more accurate recognition results. In addition, since the method of this application does not need to depend on complaints and loss reports of an object, the object can be prevented and recognized in advance, which better meets the requirement for timeliness, especially in the field of risk recognition.

The object recognition method provided in this embodiment of this application further includes: constructing a user risk system (a user recognition system) through user (namely, object) label construction and propagation, so that the user risk system can be applied to recognizing a fraud risk in advance, namely, a risk user and a risk type of the user can be recognized.

The method provided by this application can be applied in the field of mobile payment. In this field, risk recognitions of commercial fraud and social fraud in the related art are often separated, but it is found through a large number of attack cases that an account of a black industry (namely, a risk user/merchant, which can be referred to as risk user) plays a considerable role in recognition of both the commercial fraud and the social fraud. Main tasks include, but are not limited to, socializing to attract the traffic, optimizing an account, leading to do transactions, transferring funds (namely, multiple target types and risk types of objects, and the like). Based on the method provided in this embodiment of this application, risk users can be recognized from different scenes respectively, and the label propagation algorithm is then used to diffuse the risk users, to construct the user risk system which is applied to recognizing the fraud risk, to provide a new path for mining suspicious black industries.

For a better understanding and description of the scheme provided by this application, a specific optional implementation of this application is described below in combination with a mobile payment scene.

Figure 2A:
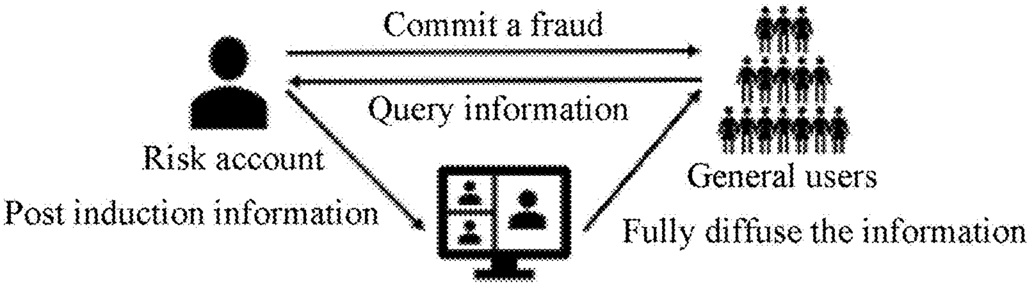
FIG. 2*a* to FIG. 2*d* are schematic diagrams of objects of several object types provided in examples of this application.

In order to facilitate the understanding, multiple procedures involved in an illegal industry are first introduced. In the whole process of an illegal fraud, multiple procedures (each procedure corresponds to one target type) such as attracting the traffic, optimizing an account, leading to do transactions and transferring funds often need to be realized depending on an account (also referred to as an illegal account/risk account, namely, an account of a risk user/merchant, representing the risk user) of a black industry. Specific representation forms have following different characteristics in different procedures:

1) Attract the traffic: As shown in FIG. 2*a*, attracting the traffic is a primary means by which an illegal industry seeks for to-be-cheated targets. A risk account typically posts a wide variety of attractive information, namely, induction messages, via a large-sized Internet platform, and disseminates these messages to general users. Once a user is attracted to ask for detailed information, the fraud is committed using a designed fraud and tactic. This type of account is often specifically used to "phishing". Once the fraud succeeds, the account is revoked immediately. Therefore, social information (namely, relevant object data corresponding to the account) of this account has a significant difference from that of a normal social account.

Figure 2B:
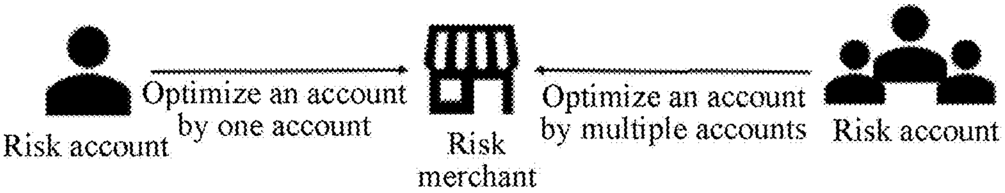

2) Operate an account: As shown in FIG. 2*b*, an account optimizing behavior often occurs in the early stage of registration of a risk merchant. In order to create a false appearance that the merchant has good business conditions, or to reserve funds for later funds transfer, or to avoid supervision of the risk management department, the illegal industry often makes multiple payments on the merchant in advance. These transactions are often completed by a single account, including several payments with a large amount of money or multiple payments of a small amount of money. Transaction vouchers are all unsearchable. In some scenes, these transactions may also be completed by multiple accounts, namely, multiple people operate an account.

Figure 2C:
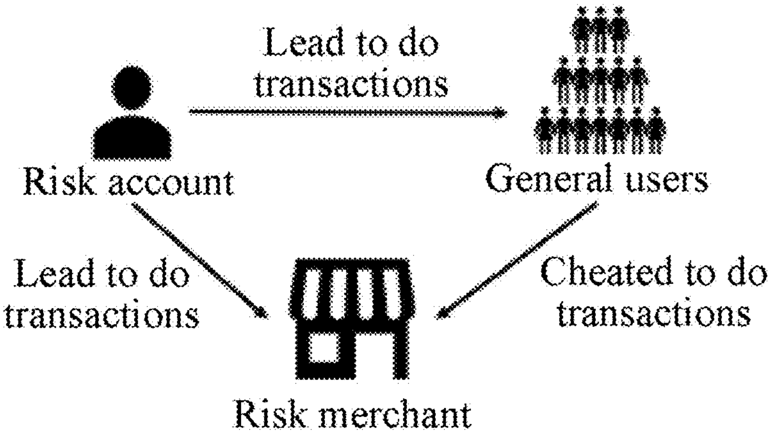

3) Lead to do transactions: As shown in FIG. 2*c*, an action of leading to do transactions often occurs in some specific scenes. A black industry will make a payment to a risk merchant while leading a user to make a payment, and hides in normal users, but a transaction frequency and amount are both greater than the transaction frequency and amount of general users. That is, a risk account leads the general users to do transactions (cheats the users to do transactions) in way of participating in these transactions (leading to do transactions).

Figure 2D:
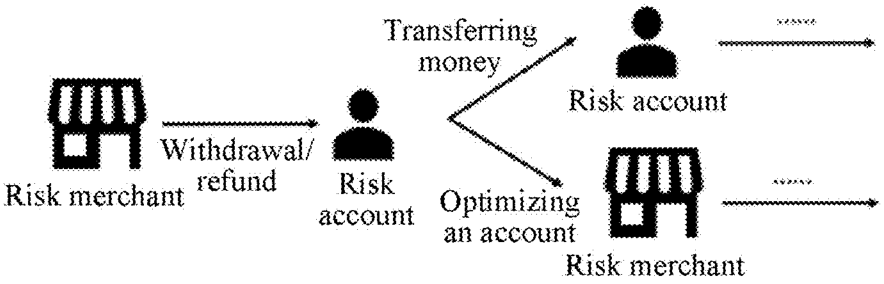

4) Transfer a fund: It includes money laundering (which is an action of legalizing illegal gains). As shown in FIG. 2*d*, since an illegal industry often operates multiple merchants at the same time, cash withdrawals will flow into other risk merchants or other risk accounts at the same time. However, when a risk merchant is punished, the illegal industry may recoup the funds reserved in the account optimizing procedure in the form of refund, to ensure that the funds are not frozen. As shown in FIG. 2*d*, one risk merchant returns the funds to a corresponding account (the risk account shown in the figure) in the form of refund, and the account may transfer the funds to another account/merchant (the ellipses and arrows in the figure identify that the account/merchant may further transfer the funds), so as to transfer the illegal gains.

The method provided by the embodiments of this application is described below in conjunction with the above-listed fraud scene involving multiple procedures.

Figure 3:
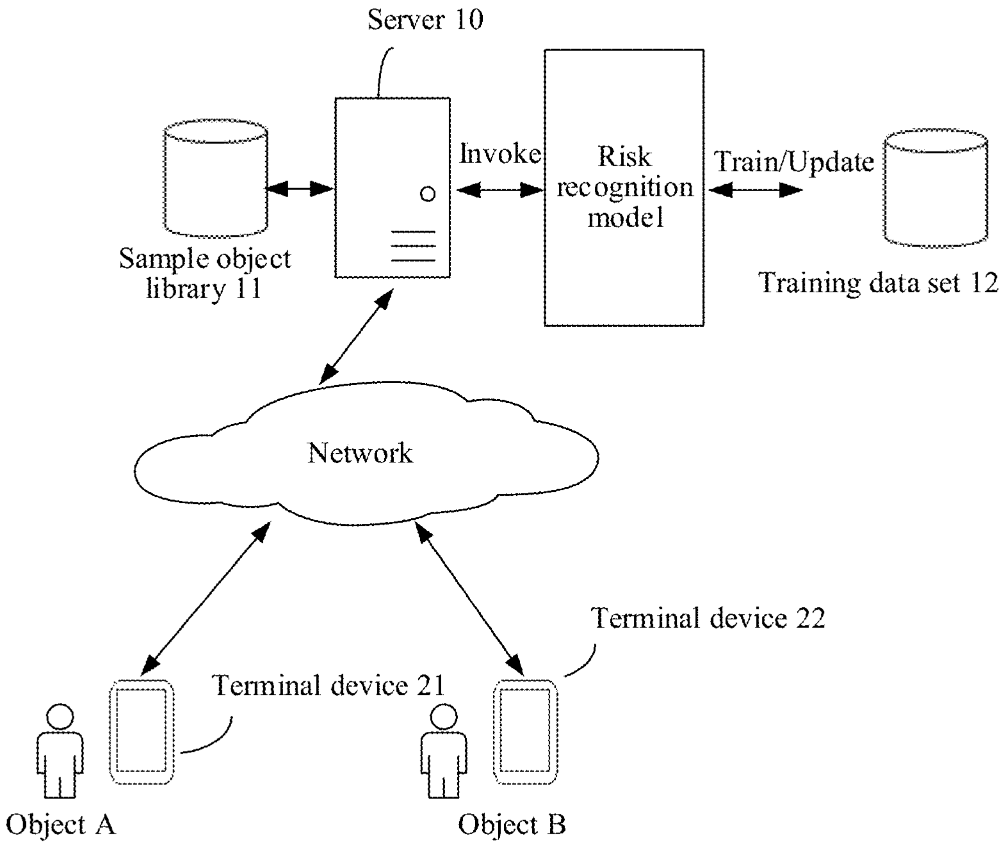
FIG. 3 is a schematic structural diagram of an object recognition system provided by an embodiment of the present application.
Figure 4:
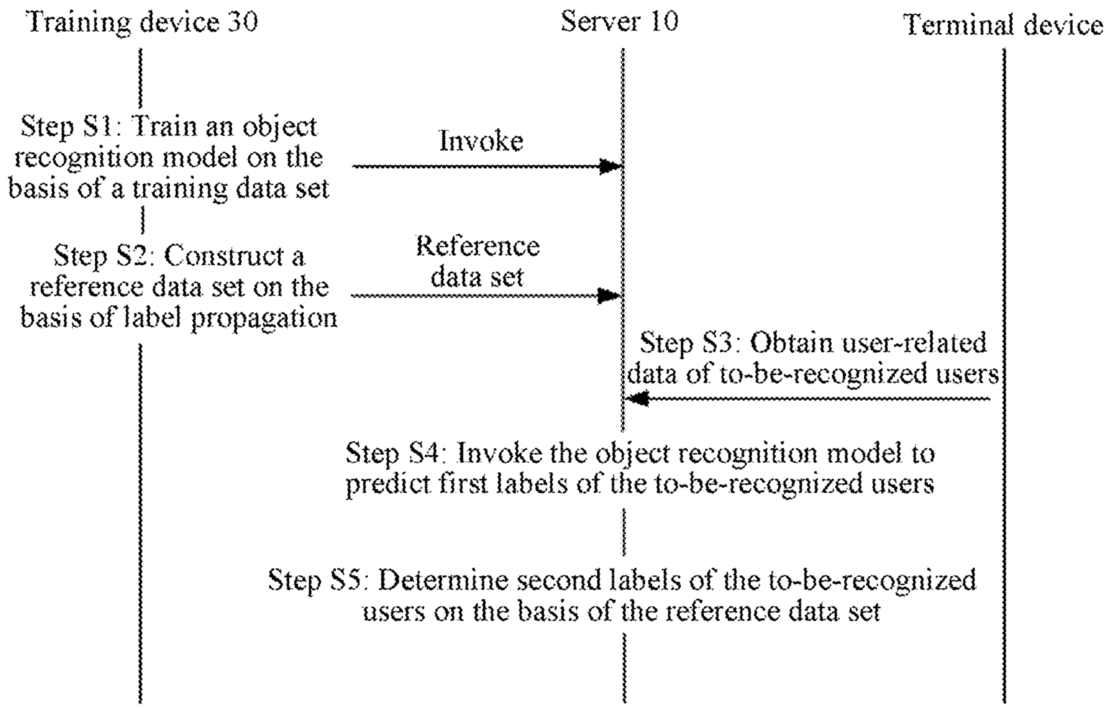
FIG. 4 is a flowchart of an object recognition method provided by an embodiment of this application.

FIG. 3 shows a schematic structural diagram of an object recognition system to which the embodiments of this application are applicable, and FIG. 4 shows a flowchart of an object recognition method in this scene. As shown in FIG. 3, the system may include a server 10 and a plurality of terminal devices (only a terminal device 21 and a terminal device 22 are shown in the figure). The terminal devices may communicate with the server 10 via a network, and a sample object library 11 of the server 10 stores relevant object data of a large number of first sample objects with annotation labels, namely, relevant object data of sample users. That is, a reference data set is stored in the sample object library 11. The terminal device 21 and the terminal device 22 may be the terminal devices of a target object A and a target object B. In some embodiments, the server 10 may be an application server of an application program having a mobile payment function and an inter-user interaction function. The users, namely, objects, of the terminal devices may interact with each other through the application program, for example, sending messages to each other and adding friends, and may also perform transactions and mobile payment through the application program. The server 10 can obtain user-related information of the users under the permissions of the users, and achieve risk recognition on the users by implementing the method provided by this embodiment of this application.

As shown in FIG. 4, the implementation process of the method may include following step S1 to step S5.

Step S1: The object recognition model is obtained on the basis of the training data set.

As shown in FIG. 2*a* to FIG. 2*d*, a black industry (which may also be referred to as: illegal industry/malicious industry) has risk accounts (representing black industry users, namely, risk users) throughout the life cycle. In different scenes, the risk accounts have different characteristics. In order to ensure that different types of black industry users will not interfere with each other in the process of model learning to result in a misjudgment, in this embodiment of this application, model training can be performed respectively according to different types of risk accounts (namely, different object types). The training of the model can be completed by the server 10 or by other electronic devices, and the server 10 predicts risk types of objects by invoking the trained object recognition model. In this embodiment, the model training step performed by a training device 30 is exemplified.

In this scheme, semi-supervised learning is used for training the model. A specific operation process is as follows:

1. Model grouping: That is, types of objects are divided, that is, the risk accounts are divided into various risk types. First, different types of risk users (namely, risk accounts) are grouped according to a life cycle of an illegal industry. For example, risk accounts for transferring funds need to realize a closed loop in inflow and outflow of funds. Therefore, the foregoing risk accounts have similar characteristics to those of risk accounts for being operated, but have behavioral differences at different time windows, namely, the risk accounts for being operated usually appear in the early stage. Therefore, the two types of risk users can be distinguished by virtue of the time windows, to perform model training. Similarly, risk accounts for attracting the traffic and risk accounts for leading to pay are also respectively subjected to model training. Of course, during the model training, the training data set also includes non-risk accounts, namely, a non-target type of users.

This step can be completed manually or by an electronic device according to a set division rule. Through this step, according to different features of different types of accounts, accounts can be grouped according to the risk types and are marked, to train a classification model on the basis of the relevant object data of these marked accounts, to obtain the object recognition model.

2. Sample obtaining: That is, a second training data set (the training data set 12 shown in FIG. 3) is constructed.

In this step, a risk account that has been marked as a risk type (namely, with an annotation label) and a normal account (namely, a non-risk account, referring to a non-risk sample object) are used as targets of model learning. The relevant object data (namely, interaction information of the account with other accounts, such as social information and payment behavior information) of these accounts (namely, the second sample objects) is taken as feature variables of model recognition.

For example, the payment behavior information refers to interaction information related to a payment/transaction, and may include payment from the account to other accounts, or may include payment from other accounts to the account. The social information is interaction information other than the payment behavior information, such as friends' information/friendliness and activeness of the account.

In a practical scene, a risk account basically induces a user to do a transaction by means of chatting and posting virtual information, and the relevant object data of the risk account will be significantly different from the relevant object data of a normal social account. The relevant object data of different types of risk accounts will also show different features. Therefore, the relevant object data of the marked risk account and the relevant object data of the normal account can be used as sample data of a training model to train the model.

The sample data may also include social behavior data of multiple unknown risk types of accounts (corresponding to the foregoing third sample objects).

3. Model training: That is, the above sample data is used to perform the model training. When the training satisfies a certain condition, the model (namely, the foregoing first classification model) is used to mark the unknown risk types of accounts, thereby obtaining unknown risk types of marked accounts, namely, pseudo labels.

During training, an input of the model is the relevant object data of an account or preprocessed relevant object data, and an output of the model is a predicted risk type, namely, a first label, of the account.

4. Model verification: The pseudo label is trained together with the marked sample. When the model achieves an expected effect, the training ends, and an object recognition model is obtained.

Figure 5:
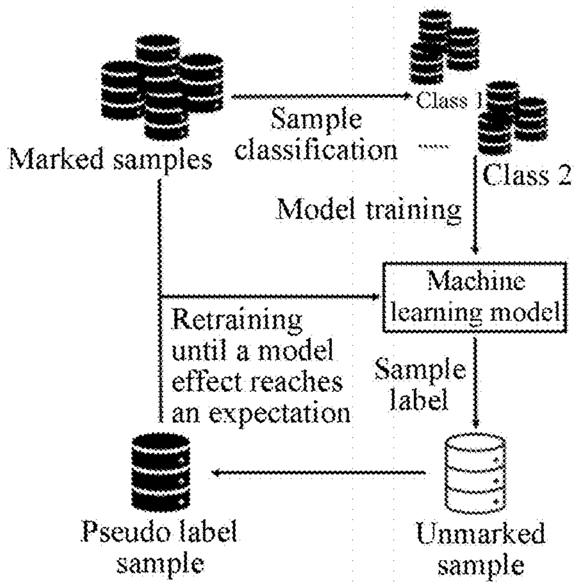
FIG. 5 is schematic diagram of a principle of an object recognition model training method provided by an embodiment of this application.

FIG. 5 shows a schematic diagram of a principle of a model training method in some embodiments provided by an embodiment of this application. As shown in FIG. 5, a marked sample is sample data with an annotation label, namely, relevant object data of a risk account with an annotation label and relevant object data of a normal account (an annotation label of which represents that there is no risk). An unmarked sample represents the relevant object data of the above unknown risk type of risk account. A machine learning model is a to-be-trained object recognition model. It can be seen from the figure that the marked sample includes sample data of various risk types (class 1, class 2 . . . ) shown in the figure.

During model training, repeated training is performed using the marked sample until a first training end condition is satisfied (for example, one or more preset training indexes satisfy a certain condition), to obtain a first classification model, and then a label of the unmarked sample is predicted by this model. Specifically, the relevant object data of the unmarked sample can be inputted into the model, to obtain a predicted first label. The first label can be used as a pseudo label of the unmarked sample, to obtain a pseudo label sample. The model continues to be iteratively trained on the basis of the marked sample data and these sample data with the pseudo labels until the effect of the model reaches an expectation, for example, until a loss function of the model converges, to obtain a trained object recognition model.

Step S2: A reference data set is constructed on the basis of label propagation.

Similarly, this step may be performed by the server 10, or by other electronic devices. The constructed reference data set is provided to the server 10 for use. In this embodiment, completing the construction of the reference data set also by the training device 30 is taken as an example.

User recognition based on semi-supervised learning (namely, the risk recognition model) helps to solve the problem of timeliness of finding user risks. However, in the process of recognizing user risk labels, in order to ensure the accuracy of model training, different types of risk users are annotated separately, which limits the expansion of a risk user system. In addition, the behavior features of the black industry will change continuously in the process of optimizing illegal accounts. Therefore, it is not conducive to long-term operation of the user risk system only by using the model to recognize user risks. Based on this, in this step, the user risk labels can be diffused on the basis of the information transmissibility of a knowledge mapping.

The foregoing describes that the risk accounts play different roles in the whole life cycle of the black industry, and different types of users can be marked by the semi-supervised learning on the basis of different features of social interaction and payment behaviors of the users. For marked users, namely, users with annotation labels, the risk labels of the users can be propagated on the basis of association relationships between the users, such as entity association and funds flow (such as transferring funds and sending red packets).

Figure 6:
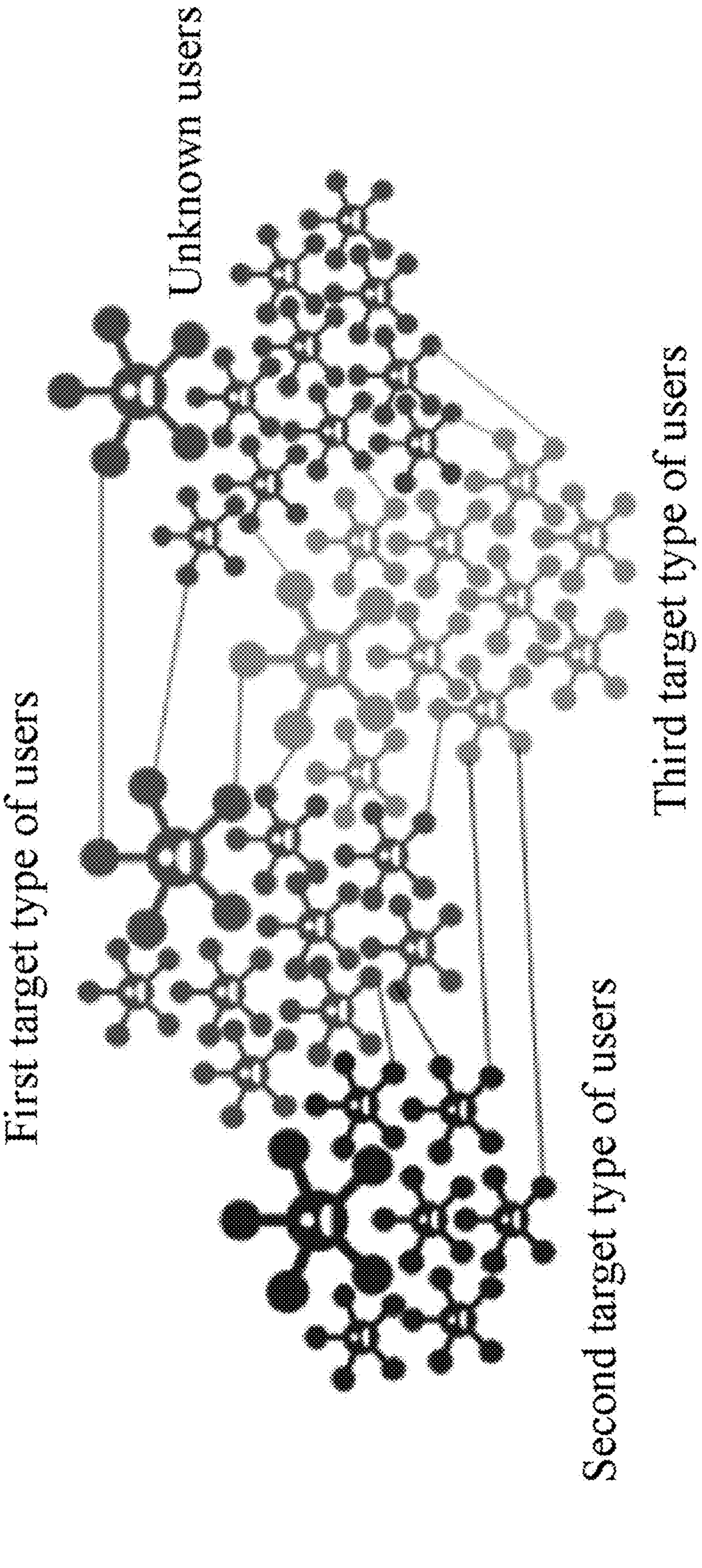
FIG. 6 is a schematic diagram of a principle of label propagation provided in an example of this application.

As shown in the schematic diagram of FIG. 6, each node in FIG. 6 represents one user. This figure shows three known risk types of users, namely, a first target type of users (such as risk users for optimizing an account), a second target type of users (such as users for attracting the traffic), and a third target type of users (such as risk users for leading to do transactions), and some unknown risk types of users (unknown users). The users may possibly have associations (association relationships can be determined according to social behavior data of the users), and risk labels between the users having the association relationships can be transmitted. As shown in FIG. 6, the risk labels of the known risk types of users will be propagated to the unknown users having the association with the known risk types of users, and the known risk types of users having the association relationships may also generate label propagation.

Figure 7A:
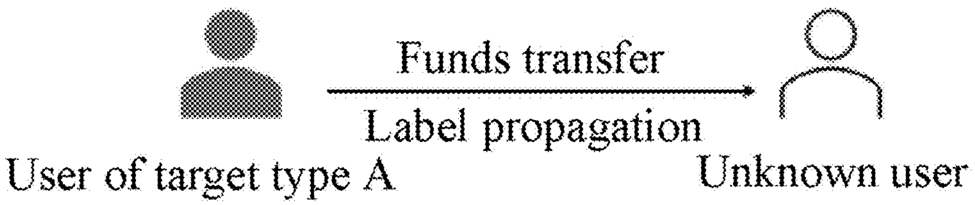
FIG. 7*a* to FIG. 7*c* are schematic diagrams of several different examples of label propagation provided in an example of this application.
Figure 7B:
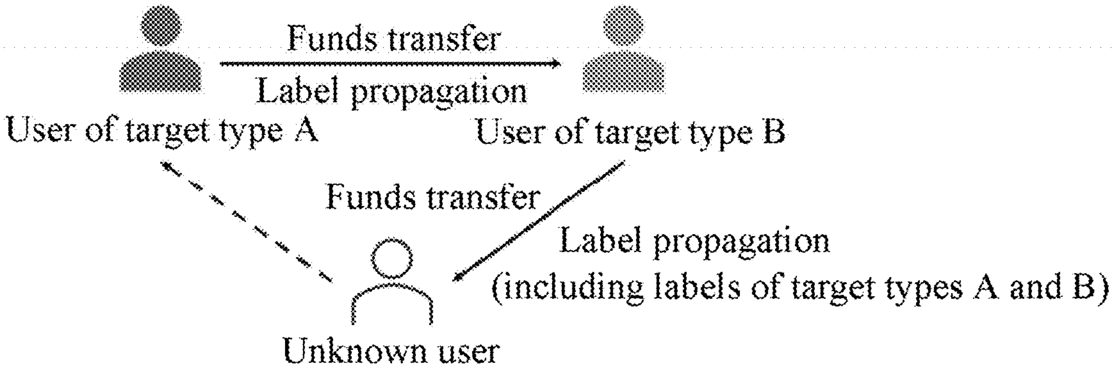
Figure 7C:
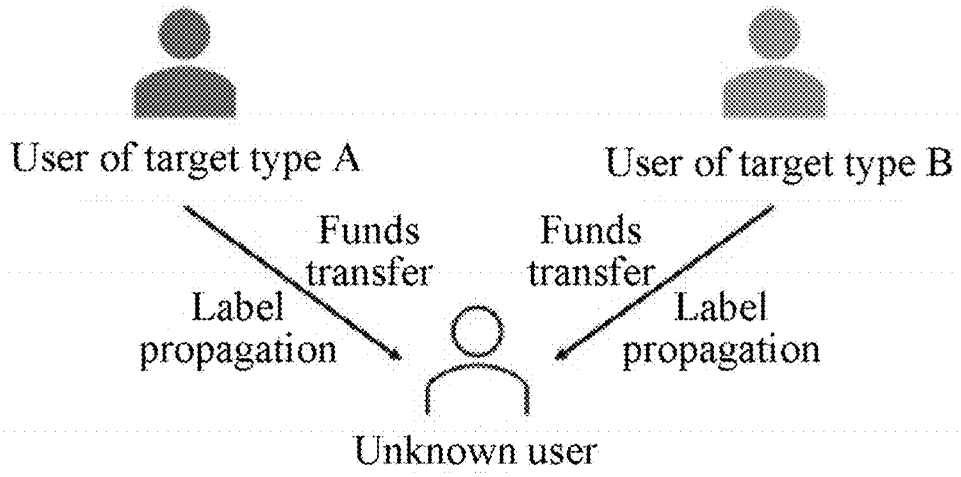

FIG. **7*a* to FIG. 7*c* schematically show several examples of risk label propagation. FIG. 7*a* is an example of one-way risk label propagation. If a funds transfer (namely, a transfer transaction) occurs between a user of target type A (for example, a risk user for optimizing an account) and an unknown user, the risk label of the risk user (for example, a label of target type A, such as a label for optimizing an account) will be propagated to the unknown user. FIG. 7*b* is an example of ring propagation of multiple types of risk labels. If a user of target type A and a user of target type B (such as risk user for transferring funds) have transferred a fund, the risk labels of the two risk users will be propagated to each other. At the same time, label propagation may be possibly performed between the two risk users and an unknown user. A closed loop of label propagation, namely, endless propagation, is likely to occur in this case, and at this time, the loop is jumped out on the basis of a loss function. FIG. 7*c*** is an example of propagation of multi-source risk labels. The risk label of an unknown user may be obtained through not only one path, risk users of different risk types (a user of target type A and a user of target type B shown in the figure) may both be associated with the same unknown user, and label information of these risk users will also be propagated to the unknown user.

It can be seen that labels between users with association relationships can all affect each other through label propagation. Therefore, these factors need to be considered for a more comprehensive and accurate assessment of a risk of a user.

Label propagation can be performed in multiple iterations according to association relationships between users. The association relationships can be divided into various types of association relationships. For example, the association relationships of the objects can be divided into three types: a resource gift association relationship such as a red packet association relationship, a resource transfer association relationship such as a transfer association relationship, and an entity association relationship. The red packet association relationship and the transfer association relationship are both divided according to flow of resources or funds. If a red packet sending or receiving action has been performed between two users (namely, accounts), it is considered that there is a red packet association relationship between the two users. If a fund has been transferred (including payment transfer or other transfer ways) between two users (namely, accounts), it is considered that there is a transfer association relationship between the two users. For the entity association, if two users are both associate with the same entity (if two users have used the same contact information), it is considered that the two users have the entity association.

It is understood that the descriptions of the above association relationships are only examples. In practical applications, different division manners can be configured in different application scenes according to requirements.

An implementation process of a label propagation algorithm is as follows:

Initialization: $y=f(0)$, $\ln(f)=\text{Loss}(0)$ (a loss function during initialization)

when Loss decreases:

label propagation: A propagation result of an $n^{th}$ label propagation is obtained from a propagation result f(n−1) of an n−1th label propagation and a user association relationship R f(n)

Results summary: The propagation result of the $n^{th}$ label propagation f(n) is summarized to p(n)

Loss calculation: is p(n) calculated on the basis of Loss(n)

Output: a result p when Loss is minimum where f(0) represents annotation labels of various first sample object in the initialization stage; f(n) represents updated labels of the first sample objects obtained after n label propagations; the user association relationship R is the foregoing second association relationship; and the result summarization refers to a step of: for each sample object, fusing the updated labels of the various objects having the association relationships with the object to obtain a fused risk label p(n) corresponding to the object. The next label propagation is performed on the basis of the fused label corresponding to each sample object and the association relationships between the sample objects until the loss function satisfies a set condition, for example, until the loss function is minimum, that is, a value of the loss function does not decrease any more, and the iteration is completed. The fused labels of the various sample objects corresponding to the minimum value of the loss function are used as second labels of the various sample objects.

A specific implementation of the label algorithm is described in detail below in conjunction with the specific implementation process, and the meanings of the various parameters mentioned above will also be explained below:

1. The loss function used in the label propagation algorithm to determine whether the multiple iterations end may be expressed as follows:

$$\text{Loss} = \alpha\sum_{i=1}^{I}\sigma_i|\hat{y}_i - y_i| + \beta\sum_{a,b}^{s}w_{a,b}|\hat{y}_a - \hat{y}_b| = \alpha\sum_{i=1}^{I}\sigma_i|\cos(p(\hat{n})_i, y_i)| + \beta\sum_{a,b}^{s}w_{a,b}|\cos(p(\hat{n})_a, p(\hat{n})_b)|$$

where $$\alpha\sum_{i=1}^{I}\sigma_i|\hat{y}_i - y_i|$$

is a first loss function;

$\beta\sum_{a,b}^{S}w_{a,b}|\hat{y}_a - \hat{y}_b|$ is a second loss function; and α and β are preset loss function weights.

Specific meanings of the various parameters in the loss function are as follows:

1) Set I represents a set of all labeled users, namely, the number of the first sample objects, and S represents a set of all similar users in set I, namely, a set of similar object pairs.

$y_i$ is an annotation label of an $i^{th}$ user/account; and $\hat{y}_i$ is a predicted label (namely, the above fused label) of the $i^{th}$ user predicted by the label propagation algorithm. It is assumed that there are four object types, namely, risk types, in total. $y_i$ and $\hat{y}_i$ may both be a one-dimensional vector which has four element values. In $y_i$, an element value corresponding to the label of the user is 1, and the other three values are 0, so $\hat{y}_i$ represents four probability values, which respectively represent probabilities that the user belongs to the various risk types after the current label propagation.

2) $\sigma_i$ indicates the importance of an $i^{th}$ risk label, namely, the importance of the $i^{th}$ labeled user. The importance of a user can be determined according to relevant data of the user, and a specific calculation manner is not limited. For example, in a funds transfer process, when the amount of funds transferred by a risk user is greater, it can be considered that the risk information is higher in effectiveness, and the importance of the user is greater.

$w_{a,b}$ represents a similarity between two users a, b (any similar object pair). In some embodiments, the similarity may be represented using a fund associated account overlap ratio:

$$w_{a,b} = \frac{A \cap B}{A \cup B},$$

that is a number of intersection sets of fund transaction accounts (a number of fund transactions between the two users)/a number of union sets of fund transaction accounts (a total number of fund transactions between the two users and all users), that is, user relationship pairs with high fund transaction account overlap ratios. That is, a larger transaction account overlap ratio of the two users indicates that the risk types of the two users are probability the same.

3) $|\cos(p(\hat{n})_i, y_i)|$ represents a cosine distance between a predicted user vector (namely, the predicted label) of account i in an $n^{th}$ label propagation and the annotation label of the account; and $|\cos(p(\hat{n})_a, p(\hat{n})_b)|$ represents a cosine distance between predicted user vectors of accounts a and b in the $n^{th}$ label propagation, wherein $p(\hat{n})_i$ represents a predicted user vector of user i, and $p(\hat{n})_a$ and $p(\hat{n})_b$ respectively represent the predicted user vectors (namely, the second labels of the users in the next propagation) of user a and user b in the $n^{th}$ label propagation.

2. An expression of label propagation can be expressed as:

$$f(n+1) = \sum_{r\in R} W_r * f(n) + W_y * y = \sum_{r\in R}(a_r * P_r * Q_r) * f(n) + W_y * y$$

Meanings of various parameters in this expression are as follows:

1) Set R represents a set of association relationships between users, for example, R={red packet, transfer, entity}. There are three types of association relationships, and r represents one of the association types.

2) $\alpha_r$ represents an influence factor of association type r (namely, a weight of each type of association relationship). Since the influence degrees of different association types are different, and the number of users having the entity associations is small, there is a big difference between red packet and transfer in the limit of funds, and an influence factor is used for adjusting a combined weight of the different association types. A value of the influence factor of each association type may be set according to a requirement or experience. For example, the value of the factor of the entity association type is relatively large, and the value of the factor of the transfer association may be greater than the factor of the red packet association.

3) $P_r$ represents an influence matrix of association type r (namely, the influence of an object corresponding to each type of association relationship). A user transferring money to 30 or more accounts and a user transferring money to two accounts apparently have a significant influence difference. An influence weight of a user is portrayed by the influence matrix. For example, the number of accounts associated with the user is normalized to obtain the influence weight of the user.

Assuming that there are N users in set I, $P_r$ can represent a vector having N element values, for example, the number of rows of the vector is N, and the number of columns of the vector is 1. The element value of each row represents a magnitude of the influence of a user corresponding to this type of association relationship, namely, the influence of the user in the corresponding type of social behavior.

4) $Q_r$ represents a path of label propagation.

Assuming that there are N nodes in a user relationship network, namely, set I, the matrix $Q_r$ has N×N dimensions. If account i transfers money to 10 accounts, values of in columns of the 10 transfer accounts corresponding to a row of account i in $Q_r$ are all 0.1, and values in other columns are all 0. The account corresponding to the element value of 0 represents that the account has no association relationship with account i, and the account corresponding to the element value of non-0 represents that the account has an association relationship with account i. The element values represent degrees of associations, namely, values representing the association relationships used during calculation.

If association type r is an entity association, it is assumed that account i has the entity association with five accounts, and the corresponding value is 0.2, and other values are all 0.

5) f(n) represents the result of the $n^{th}$ label propagation, and the result of the $(n+1)^{th}$ label propagation is obtained through the propagation of the result of the $n^{th}$ iteration and adding of a marked user label, namely, adding of newly added data.

For example, in one label propagation, the number of users in set I is N. After a propagation result of this propagation is obtained, if the number of newly added sample objects is M, the number of users in set I in next label propagation is N+M.

6) $W_y$ represents a weight of a risk type (namely, a proportion of sample objects of each risk type in set I). Since Account magnitudes of different risk types are different, standardization needs to be performed by virtue of the weights. y represents a labeled user matrix, namely, the annotation label of each sample object in set I.

That is, a normalized weight can be calculated for different risk types according to the number of labeled users of each risk type. For example, there are a total of four risk types, and the numbers of users with the annotation labels of each risk type are a1, a2, a3 and a4, so the weight of an $i^{th}$ risk type can be expressed as:

$$ai/(a1+a2+a3+a4).$$

Y is an annotation label matrix of all the users in set I. Assuming that there are N users with annotation labels in the first label propagation and that there are 4 risk types in total, the matrix may be a matrix including N rows and four columns. Each behavior is the annotation label of one user. One element value of each row is 1, and the other three element values are 0. The risk type corresponding to the element value of 1 is a real object type of the sample object. Assuming that the number of users with annotation labels in the second label propagation is N+m, Y may be a matrix including N+m rows and four columns.

Based on the above label propagation formula, the labels of the various users in set I can be continuously updated by multiple iterations.

The propagation result f(n) is obtained after n label propagations. For account x in set I, after n label propagations of all accounts A associated with account x, a corresponding result vector (predicted label) can be represented as follows:

$$p(n)_x = \sigma\left(\sum_{a}^{A} f(n)_a\right)$$

where a represents a normalization function, such as a softmax function, and a represents a user having an association relationship with user x. It can be seen from this expression that a second risk label of user x can be obtained by fusing the updated labels of all the users having the association relationships with user x and performing normalization processing. All associated accounts, namely, associated users, of a user are users corresponding to non-zero values in the row corresponding to the user in $Q_r$.

Specifically, in the iteration process, the corresponding result f(n) is obtained in each iteration. Assuming that there are N labeled users in total and that there are four risk types in total, the vector f(n) may be a matrix including N rows and four columns (or four rows and N columns); and the four values (which can be referred to as user vectors) of an $i^{th}$ row respectively represent the probabilities that an $i^{th}$ user belongs to the four risk types. After f(n) is obtained, for the $i^{th}$ user, the user vectors of the various users associated with the $i^{th}$ user are summed and then are standardized, to obtain a predicted vector of the $i^{th}$ user, that is, to obtain $p(\hat{n})_i$ used for calculating a loss function corresponding to this iteration. Assuming that user i has three associated users, the user vectors of the three users are summed and are then standardized.

Through continuous iterative updating, the user vectors of the various users are obtained when Loss no longer decreases and serves as final risk labels (namely, the second labels) of these labeled users, that is, the second labels of the sample objects in the reference data set subsequently applied to predicting recognition results of target objects. Assuming that there are a total of 5,000 labeled users in the last iteration and that user vectors p (n) of the 5,000 users can be obtained, the annotation labels, second labels, and relevant object data of the 5,000 users can be used as a reference data set.

Step S3: The server 10 obtains relevant object data, namely, user-related data, of to-be-recognized users.

Step S4: The server 10 invokes the object recognition model to predict first labels of the to-be-recognized users.

Specifically, the relevant object data of each to-be-recognized user is inputted to the object recognition model, and an initial risk label, namely, the first label, of each to-be-recognized user is obtained through model prediction. That is, which risk type to which the user belongs is preliminarily determined through the model.

Step S5: The server 10 determines second labels of the to-be-recognized users on the basis of the reference data set.

The server 10 predicts a final risk label, namely, the second label, of each to-be-recognized user on the basis of the reference data set and the relevant object data of the to-be-recognized user, and determines a recognition result of the to-be-recognized user according to the final risk label. This step may include:

a. Determine a plurality of types of association relationships between each to-be-recognized user and other users (including other to-be-recognized users and sample objects), the association relationships including but not limited to the above entity association relationship, the above resource gift association relationship such as the red packet association relationship, the above resource transfer association relationship such as the transfer association relationship, and the like.

b. Obtain the second label of each to-be-recognized user by at least one label propagation according to the following label propagation formula and the first risk label of each to-be-recognized user obtained in step S32:

$$f(n+1) = \sum_{r\in R} W_r * f(n) + W_y * y = \sum_{r\in R} (a_r * P_r * Q_r) * f(n) + W_y * y$$

As an example, it is assumed that the number of the to-be-recognized users is M and that the number of sample users is N. In the recognition stage, the number (namely, the number of the users) of the nodes in the user relationship network is M+N.

At this time, for the various above parameters in the label propagation formula, $\alpha_r$ represents an influence factor of association type r. The influence factor corresponding to each type of association relationship may be preset according to an actual requirement or experimental value, and may be the same as $\alpha_r$ in the previous iteration stage.

For the influence matrix $P_r$, for each of the (M+N) users, an influence factor (namely, an influence or an influence weight) of the user corresponding to each type of association relationship may be determined on the basis of each type of association relationship between the user and other users. Likewise, the propagation path $Q_r$ of the user in the label propagation may be determined according to the association relationship between the user and other users.

For example, relationship type r is taken as an example. For the (M+N) users, the influence matrix $P_r$, can be obtained including M+N values, representing the respective influence weights of the (M+N) users. $Q_r$ is a matrix with (N+M)×(N+M) dimensions.

$W_y$ is a weight of a risk type, a value of which is the same value as that in the iteration stage. Y in the application stage is the initial risk labels of the (N+M) users. For each to-be-recognized user, the initial risk label is the first label predicted by the object recognition model. For each sample user, the initial risk label is the annotation label of the sample user.

In the application stage, in the first label propagation, the second labels of the various sample users in f(n) include the second labels (namely, $p(\hat{n})_i$ of the last iteration) of the N sample users and the first labels of the M to-be-recognized users.

According to the above label propagation formula, f(n+1) is calculated at this time; f(n+1) is a matrix of one (N+M)×k; k represents the number of risk types, such as four. If only one label propagation is performed, the final result vector of each to-be-recognized user can be calculated through $$p(n)_x = \sigma\left(\sum\nolimits_a^A f(n)_a\right)$$

according to f(n+1), that is, the second label of each to-be-recognized user. The vector includes k probability values, and a risk type corresponding to a maximum probability value or a probability value exceeding a threshold can be determined as the risk type of the to-be-recognized user. If the label propagation is performed for multiple times, in the second label propagation, result vectors of the various users (including the to-be-recognized users and the sample users) obtained by the first label propagation are used as initial values of f(n) of this propagation; label update is performed again on the basis of the label propagation formula; the operation is repeated until the number of propagations reach a set number (namely, a preset maximum number of propagations); result vectors of the to-be-recognized users obtained in the last propagation are used as the second labels of the to-be-recognized users.

It is understood that in practical implementation, in order to avoid an infinite loop, when the result vectors corresponding to this propagation during each label propagation are calculated, the result vectors of the various users shall be calculated one by one, and the order of one-by-one calculation is not limited. However, for a user, after the result vector corresponding to the user has been calculated, the result vector of the user will not be calculated again even if the result vectors of the various users having the association relationships with the user change again.

In addition, in practical applications, social behavior data of various types of new risk users can also be continuously collected. That is, the training data set 12 can be continuously updated and expanded, and the risk recognition model can be updated and trained again periodically or when an updated data volume reaches a certain number, to further improve the performance of the model. Similarly, the data in the sample object library 11 may also be updated to expand the data volume of the sample users.

In the method provided in the embodiment of this application, disassembling is first performed on the basis of a life cycle of an illegal industry, and model recognition and annotation are performed for different types of risk accounts; a label propagation algorithm is innovatively used on the basis of user association relationships, to realize the propagation of user risk labels and improve a risk user system. Based on the method, different risk types of users are portrayed, and long-term operation and maintenance of risk user labels are guaranteed, which can be better applied in strategic fighting of risk users and provides a new idea for recognizing risk users in advance. Compared with the method in the related art, the scheme provided in this embodiment of this application has the following advantages:

1) The timeliness of finding risk users can be improved.

For each possible stage of the fraudulent behavior of the illegal industry, risk recognition for users can be achieved by similarity analysis, namely association analysis, of risk users in any stage, without only depending on lagging information such as customers' complaints. In this way, pre-recognition and strategic fighting of fraudulent transactions can be performed under different scenes by virtue of users of different risk types, which is better applicable to different fraud scenes and fighting means and can improve the timeliness of strategically recognizing fraudulent behaviors and the accuracy of recognizing fraudulent behaviors can be improved.

2) The coverage rate of user risk labels is increased.

The risk labels are propagated by the information association between the users on the basis of the label propagation algorithm of the association mapping between the users, and the coverage range of risk users is expanded. By the construction and propagation of the user risk labels, the constructed user risk system can portray the risk attributes of all the users having transactions (such as mobile payment), and has many applications in pre-recognition of a fraud risk. For example:

1. For a risk user with a risk of attracting the traffic, social activities of the user can be tracked to prompt other users that there may be a risk to do transactions with the user. For example, when the user is engaged in a large-amount transaction with a newly added friend, real-time strategical fighting may be performed to prevent the user from falling into a fraud trap.

2. For a user with a risk of optimizing an account, fraudulent merchants can be pre-recognized through a payment behavior of the user on the merchant in the previous stage. Merchants frequently traded by the user can be recognized in advance, and merchants likely to perform fraudulent transactions at the later stage can be recognized in the account optimizing stage. These merchants are punished.

3. For a user with a transfer and laundering risk, flow of the funds of the user can be monitored, and illegal flow of the funds can be prevented in time. For example, when this type of user transfers a large amount of fund, the user can be controlled, to avoid funds transfer.

4. In the process of constructing the user risk system, users without any attribute may be found, including a backup account and a zombie account. These accounts may be tools used by the illegal industry for late-stage fraud and may provide new source data for recognizing a fraud risk.

For example, when the probability/weight of each risk attribute of an account predicted using the label propagation algorithm for prediction is 0, that is, when values of all attribute dimensions in the result vector of the account are all 0, it can be considered that this account is a backup account/zombie account. In this way, social information, payment behavior information and the like of such an account can be taken as newly added samples of the risk recognition model. After being trained, the model can not only predict all types of risk accounts, but also recognize backup accounts/zombie accounts and other types of accounts.

Figure 8:
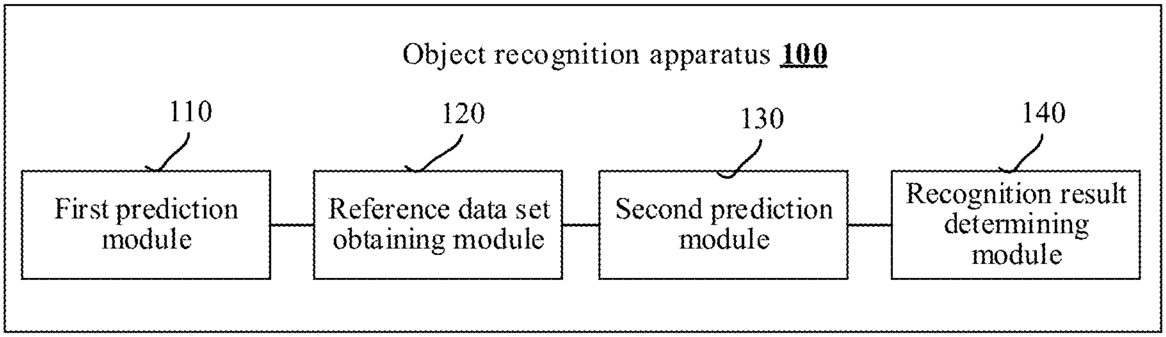
FIG. 8 is a schematic structural diagram of an object recognition apparatus provided by an embodiment of the present application.

Based on the same principle as the method provided by the embodiments of this application, the embodiments of this application also provide an object recognition apparatus. As shown in FIG. 8, the object recognition apparatus 100 may include a first prediction module 110, a reference data set obtaining module 120, a second prediction module 130, and a recognition result determining module 140.

The first prediction module 110 is configured to obtain relevant object data of at least one target object; and predict, for each target object, a first label of the target object by an object recognition model on the basis of the relevant object data of the target object, the first label representing an object type, to which the object belongs, among a plurality of object types.

The reference data set obtaining module 120 is configured to obtain a reference data set, the reference data set including relevant object data and second labels of a plurality of first sample objects with annotation labels and a second label, the annotation label of one first sample object representing a real object type, to which the first sample object belongs, among the plurality of object types, and the second label representing a probability that the first sample object belongs to each of the plurality of object types.

The second prediction module 430 is configured to determine first association relationships between the at least one target object and the plurality of first sample objects according to the relevant object data of each target object and the relevant object data of each first sample object, and determine a second label of each target object according to the first label of each target object, the annotation label and second label of each first sample object, and the first association relationship.

The recognition result determining module 140 is configured to determine a recognition result of each target object according to the second label of each target object.

In some embodiments, the second prediction module may be specifically configured to:

take the first label of each target object as an annotation label and an initial second label of the target object, perform at least one label propagation between the target object and the first sample object on the basis of the first association relationship according to the annotation label and second label of each target object and the annotation label and second label of each first sample object, and obtain an updated fifth label of each target object and an updated fifth label of each first sample object; and fuse, for each target object according to the first association relationships, the updated fifth labels of the various objects having the first association relationships with the target object, to obtain the second label of the target object.

In some embodiments, the second prediction module may perform the following operations in each label propagation:

updating, for each of the target object and the first sample object, the second label of the object according to the first association relationship on the basis of the second labels of the various objects having association relationships with the object; and fusing, for each object, an updated second label of the object with the annotation label of the object to obtain a fifth label of the object, and take the fifth label of the object as a second label of the object in next label propagation.

In some embodiments, the relevant object data includes at least one type of relevant object data, and the first association relationship includes a type of association relationship corresponding to each type of relevant object data. Correspondingly, the second prediction module may be configured to:

obtain a weight corresponding to each type of association relationship; and determine the second label of each target object according to the first label of each target object, the annotation label and second label of each first sample object, each type of association relationship, and the weight corresponding to each type of association relationship. In some embodiments, the second prediction module may be configured to: determine, for each of the at least one target object and the plurality of first sample objects, an influence of the object according to the relevant object data; and determine the second label of each target object according to the first label of each target object, the annotation label and second label of each first sample object, the influences of each target object and each first sample object, and the first association relationship.

In some embodiments, the relevant object data includes at least one type of relevant object data; the first association relationship includes a type of association relationship corresponding to each type of relevant object data; and the influence of each of the at least one target object and the plurality of first sample objects includes an influence of each object corresponding to each type of association relationship.

In some embodiments, the second prediction module may be configured to: determine a proportion of the number of objects of each object type of the at least one target object and the plurality of first sample objects according to the first label of each target object and the annotation label of each first sample object; take the proportion of the number of objects of each object type as a weight, weight the first labels of the corresponding object type of the at least one target object, and weight the annotation labels of the corresponding object type of the plurality of first sample objects; and determine the second label of each target object according to a weighted first label of each target object, a weighted annotation label and a weighted second label of each first sample object, and the first association relationship.

In some embodiments, the object recognition model is obtained by a model training module by performing the following operations:

obtaining a first training data set, the first training data set including relevant object data of a plurality of second sample objects with annotation labels and relevant object data of a plurality of unlabeled third sample objects, and real object types of the plurality of second sample objects including each of the plurality of object types;

training an initial classification model on the basis of the relevant object data of the plurality of second sample objects, and obtaining a first classification model until a first training end condition is satisfied; predicting, for each third sample object, an object type of the third sample object through the first classification model on the basis of the relevant object data of the third sample object, and determining an annotation label of the third sample object according to the object type; and continuously training the first classification model on the basis of the relevant object data of the plurality of second sample objects and the relevant object data of the plurality of third sample objects with the annotation labels, and obtaining the object recognition model until a second training end condition is satisfied.

In some embodiments, the reference data set is obtained by a reference data set obtaining module by:

obtaining a second training data set, the second training data set including the relevant object data of the plurality of first sample objects with the annotation labels; determining second association relationships between the various first sample objects in the second training data set according to the relevant object data of each first sample object; and taking the annotation label of each first sample object as an initial third label of the first sample object, repeatedly performing the following operations until updated third labels of the plurality of first sample objects satisfy a preset condition, and determining that the third label of each first sample object when the preset condition is satisfied is the second label of the first sample object: obtaining, on the basis of the second association relationships and the annotation labels and third labels of the various first sample objects, an updated fourth label of each first sample object by performing label propagation between the plurality of first sample objects; and fusing, for each first sample object according to the second association relationships, the fourth labels of the various first sample objects having the association relationships with the first sample object, to obtain a new third label of the first sample object.

In some embodiments, the reference data set obtaining module may be further configured to:

obtain newly added data after each label propagation, the newly added data including relevant object data of at least one fourth sample object with an annotation label; take each fourth sample object in the newly added data as a newly added first sample object in the second training data set, to update the second training data set; and determine a second association relationship between the various first sample objects in an updated second training data set according to the relevant object data of each first sample object in the updated second training data set, to obtain an updated second association relationship.

When obtaining the updated fourth label of each first sample object, the reference data set obtaining module may be configured to:

take the annotation label of each newly added first sample object as the third label of the first sample object, and obtain, on the basis of the updated second association relationships and the annotation labels and third labels of the various updated first sample objects, the fourth label of each updated first sample object by performing label propagation between the plurality of updated first sample objects.

In some embodiments, the annotation labels of the various fourth sample objects in the newly added data are obtained by:

obtaining relevant object data of at least one unlabeled fourth sample object; and predicting, for each fourth sample object among the at least one unlabeled fourth sample object, the first label of the fourth sample object through the object recognition model on the basis of the relevant object data of the fourth sample object, and taking the first label of the fourth sample object as the annotation label of the fourth sample object.

In some embodiments, for each label propagation, the reference data set obtaining module is further configured to:

determine similar object pairs among the plurality of first sample objects on the basis of the relevant object data of the plurality of first sample objects; wherein the preset condition is satisfied, which includes that a value of a loss function satisfies a set condition; and the loss function includes a first loss function and a second loss function; for each label propagation, a value of the first loss function represents differences between the annotation labels and the new third labels of the various first sample objects; and a value of the second loss function represents differences between the new third labels of the various similar object pairs.

The apparatus of this embodiment of this application can perform the method provided by the embodiments of this application, and the implementation principles of the apparatus and the method are similar. The actions performed by the various modules in the apparatus of this embodiment of this application correspond to the steps in the method of the embodiments of this application. For a detailed functional description of the various modules of the apparatus, reference can be made in particular to the description of the corresponding method shown in the foregoing description, and the detailed functional description will not be repeated here.

Based on the same principles of the method and apparatus provided by the embodiments of this application, the embodiments of this application further provide an electronic device. The electronic device may include a memory and a processor. The memory stores a computer program, and when running the computer program, the processor is configured to implement the method provided by any of the optional embodiments of this application or to perform the actions of the apparatus provided by any of the optional embodiments of this application.

Figure 9:
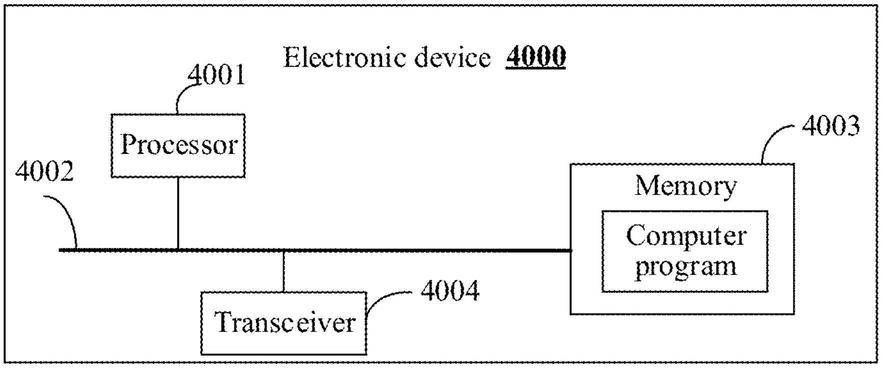
FIG. 9 is a schematic diagram of a structure of an electronic device applicable in an embodiment of this application.

As an optional embodiment, FIG. 9 shows a schematic structural diagram of an electronic device according to an embodiment of this application. As shown in FIG. 9, the electronic device 4000 includes a processor 4001 and a memory 4003. The processor 4001 is connected to the memory 4003, for example, via a bus 4002. Optionally, the electronic device 4000 may also include a transceiver 4004. The transceiver 4004 may be configured for data interaction between the electronic device and other electronic devices, such as to transmit and/or receive data. In practical applications, there is more than one transceiver 4004. The structure of the electronic device 4000 does not constitute a limitation on the embodiments of this application.

The processor 4001 may be a Central Processing Unit (CPU), a general purpose processor, a Digital Signal Processor (DSP), an Application Specific Integrated Circuit (ASIC), a Field Programmable Gate Array (FPGA) or other programmable logic devices, a transistor logic device, a hardware component, or any combination thereof. Various illustrative logical blocks, modules, and circuits described in connection with the contents of this application may be implemented or performed. The processor 4001 may also be a combination that performs a computing function, for example, a combination including one or more microprocessors, a combination of a DSP and a microprocessor, and the like.

The bus 4002 may include a path to transfer information between the above components. The bus 4002 may be a Peripheral Component Interconnect (PCI) bus, an Extended Industry Standard Architecture (EISA) bus, or the like. The bus 4002 may be divided into an address bus, a data bus, a control bus, and the like. For ease of representation, only one thick line is used to represent the bus in FIG. 9, but this does not mean that there is only one bus or only one type of bus.

The memory 4003 may be a Read Only Memory (ROM) or other type of static storage devices that may store static information and instructions, a Random Access Memory (RAM) or other type of dynamic storage devices that may store information and instructions, an Electrically Erasable Programmable Read Only Memory (RRPROM), a Compact Disc Read Only Memory (CD-ROM), or other optical disk storages (including a compact disk, a laser disk, an optical disk, a digital versatile disk, a blue-ray disk, and the like), magnetic disk storage media, other magnetic storage devices, or any other media that can be used to carry or store computer programs and that can be read by a computer, which is not limited here.

The memory 4003 is configured to store computer programs that perform the embodiments of this application and is controlled for execution by the processor 4001. The processor 4001 is configured to perform computer programs stored in the memory 4003 to implement the steps shown in the previous method embodiments.

The embodiments of this application provide a computer-readable storage medium which stores a computer program which, when executed by a processor, performs the steps and corresponding contents of the aforementioned method embodiments.

The embodiments of this application further provide a computer program product including a computer program which, when executed by a processor, performs the steps and corresponding contents of the aforementioned method embodiments.

The embodiments of this application further provide a computer program product or a computer program, the computer program product or the computer program including computer instructions stored in a computer-readable storage medium. A processor of a computer device reads the computer instructions from the computer-readable storage medium and executes the computer instructions, causing the computer device to implement the method provided in any optional embodiment of this application.

It is understood that although various operation steps are indicated by arrows in the flowcharts of the embodiments of this application, the order in which the steps are performed is not limited to the order indicated by the arrows. In some implementation scenes of the embodiments of this application, the implementation steps in the flowcharts may be performed in other orders as desired, unless explicitly stated herein. In addition, some or all of the steps in the flowcharts may include multiple sub-steps or multiple stages based on actual implementation scenes. Some or all of these sub-steps or stages may be performed at the same time, and each of the sub-steps or stages may be performed at different time points respectively. The order of execution of these sub-steps or stages can be flexibly configured according to requirements in scenes with different execution time points, and the embodiments of this application do not limit this.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The above-mentioned descriptions are merely optional implementations of some implementation scenes of this application. For persons of ordinary skill in the art, other similar implementation measures based on the technical idea of this application are used without departing from the technical concepts of the schemes of this application, which also fall within the protection scope of the embodiments of this application.

What is claimed is:

1. An object recognition method performed by an electronic device, the method comprising:

obtaining relevant object data of a target object, wherein the target object is an account of a social networking platform and the relevant object data represents transactions between the account and other accounts on the social networking platform;

predicting a first label of the target object by an object recognition model based on the relevant object data of the target object, the first label representing an object type among a plurality of object types and each object type representing a particular type of fraudulent transactions on the social networking platform, wherein the object recognition model is a neural network that has been pre-trained based on a training data set obtained from the social networking platform;

obtaining a reference data set, the reference data set comprising relevant object data and second labels of a plurality of first sample objects with annotation labels, a first sample object of the plurality of first sample objects having an annotation label of the first sample object representing a real object type among the plurality of object types, and a second label of the first sample object representing a probability that the first sample object belongs to each of the plurality of object types, wherein the annotation label of the first sample object is a vector of n elements that has one element being 1 and (n−1) elements being 0 and the second label of the first sample object is also a vector of n elements and a sum of the elements in the second label being 1;

determining first association relationships between the target object and the plurality of first sample objects according to the relevant object data of the target object and the relevant object data of the plurality of first sample objects, wherein a first association relationship of the first association relationships between the target object and a first sample object of the plurality of first sample objects indicates a probability that the target object and the first sample object perform same types of fraudulent transactions on the social networking platform;

determining a second label of the target object according to the first label of the target object, the corresponding annotation labels, the corresponding second labels and the corresponding first association relationships of the plurality of first sample objects as a recognition result of the target object; and preventing the target object from performing predefined transactions with other accounts of the social networking platform using the second label of the target object.

2. The method according to claim 1, wherein the determining the second label of the target object according to the first label of the target object, the corresponding annotation labels, the corresponding second labels and the corresponding first association relationships of the plurality of first sample objects as the recognition result of the target object comprises:

taking the first label of the target object as an annotation label and an initial second label of the target object;

performing at least one label propagation between the target object and the plurality of first sample objects based on the first association relationships between the target object and the plurality of first sample objects according to the annotation label and the second label of the target object and the annotation labels and the second labels of the plurality of first sample objects, and obtaining an updated fifth label of the target object and obtaining updated fifth labels of the plurality of first sample objects; and fusing, according to the first association relationships between the target object and the plurality of first sample objects, the updated fifth label of the target object and the updated fifth labels of the plurality of first sample objects having the first association relationships with the target object, to obtain the second label of the target object.

3. The method according to claim 1, wherein the first association relationships are divided into multiple association relationship types, each association relationship type of the multiple association relationship types corresponding to a portion of the relevant object data; and the determining the second label of the target object according to the first label of the target object, the corresponding annotation labels, the corresponding second labels and the corresponding first association relationships of the plurality of first sample objects as the recognition result of the target object comprises:

obtaining a weight corresponding to each association relationship type; and determining the second label of the target object according to the first label of the target object, the annotation label and the second label of each of the plurality of first sample objects, the association relationship type, and the weight corresponding to the association relationship type.

4. The method according to claim 1, further comprising:

determining, for the plurality of first sample objects, influences of the plurality of first sample objects according to the relevant object data; and the determining the second label of the target object according to the first label of the target object, the corresponding annotation labels, the corresponding second labels and the corresponding first association relationships of the plurality of first sample objects as the recognition result of the target object comprises:

determining the second label of the target object according to the first label of the target object, the annotation label and the second label of each of the plurality of first sample objects, the influences of the plurality of first sample objects, and the first association relationships between the target object and the plurality of first sample objects.

5. The method according to claim 1, further comprising:

determining a proportion of a number of objects of each object type among the target object and the plurality of first sample objects according to the first label of the target object and the annotation label of each of the plurality of first sample objects; and the determining the second label of the target object according to the first label of the target object, the corresponding annotation labels, the corresponding second labels and the corresponding first association relationships of the plurality of first sample objects as the recognition result of the target object comprises:

taking the proportion of the number of objects of each object type as a weight, weighting the first label of the corresponding object type of the target object, and weighting the annotation labels of the corresponding object type of the plurality of first sample objects; and determining the second label of the target object according to the weighted first label of the target object, the weighted annotation label and the weighted second label of each of the plurality of first sample objects, and the first association relationships between the target object and the plurality of first sample objects.

6. The method according to claim 1, wherein the reference data set is obtained by:

obtaining a second training data set, the second training data set comprising the relevant object data of the plurality of first sample objects with the annotation labels;

determining second association relationships between the plurality of first sample objects in the second training data set according to the relevant object data of plurality of first sample objects; and taking the annotation label of each plurality of first sample objects as an initial third label of the first sample object, repeatedly performing the following operations until updated third labels of the plurality of first sample objects satisfy a preset condition, and determining that the third label of each of the plurality of first sample objects, when the preset condition is satisfied, is the second label of the first sample object:

obtaining, based on the second association relationships and the annotation labels and third labels of the plurality of first sample objects, updated fourth labels of the plurality of first sample objects by performing label propagation between the plurality of first sample objects; and fusing, for each first sample object of the plurality of first sample objects, the updated fourth labels of the plurality of first sample objects having the second association relationships with the first sample object, to obtain a new third label of the first sample object.

7. An electronic device, comprising a memory, a processor, and a computer program stored on the memory that, when executed by the processor, causes the electronic device to perform an object recognition method including:

obtaining relevant object data of a target object, wherein the target object is an account of a social networking platform and the relevant object data represents transactions between the account and other accounts on the social networking platform;

predicting a first label of the target object by an object recognition model based on the relevant object data of the target object, the first label representing an object type among a plurality of object types and each object type representing a particular type of fraudulent transactions on the social networking platform, wherein the object recognition model is a neural network that has been pre-trained based on a training data set obtained from the social networking platform;

obtaining a reference data set, the reference data set comprising relevant object data and second labels of a plurality of first sample objects with annotation labels, a first sample object of the plurality of first sample objects having an annotation label of the first sample object representing a real object type among the plurality of object types, and a second label of the first sample object representing a probability that the first sample object belongs to each of the plurality of object types, wherein the annotation label of the first sample object is a vector of n elements that has one element being 1 and (n−1) elements being 0 and the second label of the first sample object is also a vector of n elements and a sum of the elements in the second label being 1;

determining first association relationships between the target object and the plurality of first sample objects according to the relevant object data of the target object and the relevant object data of the plurality of first sample objects, wherein a first association relationship of the first association relationships between the target object and a first sample object of the plurality of first sample objects indicates a probability that the target object and the first sample object perform same types of fraudulent transactions on the social networking platform;

determining a second label of the target object according to the first label of the target object, the corresponding annotation labels, the corresponding second labels and the corresponding first association relationships of the plurality of first sample objects as a recognition result of the target object; and preventing the target object from performing predefined transactions with other accounts of the social networking platform using the second label of the target object.

8. The electronic device according to claim 7, wherein the determining the second label of the target object according to the first label of the target object, the corresponding annotation labels, the corresponding second labels and the corresponding first association relationships of the plurality of first sample objects as the recognition result of the target object comprises:

taking the first label of the target object as an annotation label and an initial second label of the target object;

performing at least one label propagation between the target object and the plurality of first sample objects based on the first association relationships between the target object and the plurality of first sample objects according to the annotation label and the second label of the target object and the annotation labels and the second labels of the plurality of first sample objects, and obtaining an updated fifth label of the target object and obtaining updated fifth labels of the plurality of first sample objects; and fusing, according to the first association relationships between the target object and the plurality of first sample objects, the updated fifth label of the target object and the updated fifth labels of the plurality of first sample objects having the first association relationships with the target object, to obtain the second label of the target object.

9. The electronic device according to claim 7, wherein the first association relationships are divided into multiple association relationship types, each association relationship type of the multiple association relationship types corresponding to a portion of the relevant object data; and the determining the second label of the target object according to the first label of the target object, the corresponding annotation labels, the corresponding second labels and the corresponding first association relationships of the plurality of first sample objects as the recognition result of the target object comprises:

obtaining a weight corresponding to each type of association relationship type; and determining the second label of the target object according to the first label of the target object, the annotation label and the second label of the plurality of first sample objects, the association relationship type, and the weight corresponding to the association relationship type.

10. The electronic device according to claim 7, wherein the method further comprises:

determining, for the plurality of first sample objects, influences of the plurality of first sample objects according to the relevant object data; and the determining the second label of the target object according to the first label of the target object, the corresponding annotation labels, the corresponding second labels and the corresponding first association relationships of the plurality of first sample objects as the recognition result of the target object comprises:

determining the second label of the target object according to the first label of the target object, the annotation label and the second label of each of the plurality of first sample objects, the influences of the plurality of first sample objects, and the first association relationships between the target object and the plurality of first sample objects.

11. The electronic device according to claim 7, wherein the method further comprises:

determining a proportion of a number of objects of each object type among the target object and the plurality of first sample objects according to the first label of the target object and the annotation label of each of the plurality of first sample objects; and the determining the second label of the target object according to the first label of the target object, the corresponding annotation labels, the corresponding second labels and the corresponding first association relationships of the plurality of first sample objects as the recognition result of the target object comprises:

taking the proportion of the number of objects of each object type as a weight, weighting the first label of the corresponding object type of the target object, and weighting the annotation labels of the corresponding object type of the plurality of first sample objects; and determining the second label of the target object according to the weighted first label of the target object, the weighted annotation label and the weighted second label of each of the plurality of first sample objects, and the first association relationships between the target object and the plurality of first sample objects.

12. The electronic device according to claim 7, wherein the reference data set is obtained by:

obtaining a second training data set, the second training data set comprising the relevant object data of the plurality of first sample objects with the annotation labels;

determining second association relationships between the plurality of first sample objects in the second training data set according to the relevant object data of plurality of first sample objects; and taking the annotation label of each plurality of first sample objects as an initial third label of the first sample object, repeatedly performing the following operations until updated third labels of the plurality of first sample objects satisfy a preset condition, and determining that the third label of each of the plurality of first sample objects, when the preset condition is satisfied, is the second label of the first sample object:

obtaining, based on the second association relationships and the annotation labels and third labels of the plurality of first sample objects, updated fourth labels of the plurality of first sample objects by performing label propagation between the plurality of first sample objects; and fusing, for each first sample object of the plurality of first sample objects, the updated fourth labels of the plurality of first sample objects having the second association relationships with the first sample object, to obtain a new third label of the first sample object.

13. A non-transitory computer-readable storage medium storing a computer program that, when executed by a processor of an electronic device, causes the electronic device to perform an object recognition method including:

obtaining relevant object data of a target object, wherein the target object is an account of a social networking platform and the relevant object data represents transactions between the account and other accounts on the social networking platform;

predicting a first label of the target object by an object recognition model based on the relevant object data of the target object, the first label representing an object type among a plurality of object types and each object type representing a particular type of fraudulent transactions on the social networking platform, wherein the object recognition model is a neural network that has been pre-trained based on a training data set obtained from the social networking platform;

obtaining a reference data set, the reference data set comprising relevant object data and second labels of a plurality of first sample objects with annotation labels, a first sample object of the plurality of first sample objects having an annotation label of the first sample object representing a real object type among the plurality of object types, and a second label of the first sample object representing a probability that the first sample object belongs to each of the plurality of object types, wherein the annotation label of the first sample object is a vector of n elements that has one element being 1 and (n−1) elements being 0 and the second label of the first sample object is also a vector of n elements and a sum of the elements in the second label being 1;

determining first association relationships between the target object and the plurality of first sample objects according to the relevant object data of the target object and the relevant object data of the plurality of first sample objects, wherein a first association relationship of the first association relationships between the target object and a first sample object of the plurality of first sample objects indicates a probability that the target object and the first sample object perform same types of fraudulent transactions on the social networking platform;

determining a second label of the target object according to the first label of the target object, the corresponding annotation labels, the corresponding second labels and the corresponding first association relationships of the plurality of first sample objects as a recognition result of the target object; and preventing the target object from performing predefined transactions with other accounts of the social networking platform using the second label of the target object.

14. The non-transitory computer-readable storage medium according to claim 13, wherein the determining the second label of the target object according to the first label of the target object, the corresponding annotation labels, the corresponding second labels and the corresponding first association relationships of the plurality of first sample objects as the recognition result of the target object comprises:

taking the first label of the target object as an annotation label and an initial second label of the target object;

performing at least one label propagation between the target object and the plurality of first sample objects based on the first association relationships between the target object and the plurality of first sample objects according to the annotation label and the second label of the target object and the annotation labels and the second labels of the plurality of first sample objects, and obtaining an updated fifth label of the target object and obtaining updated fifth labels of the plurality of first sample objects; and fusing, according to the first association relationships between the target object and the plurality of first sample objects, the updated fifth label of the target object and the updated fifth labels of the plurality of first sample objects having the first association relationships with the target object, to obtain the second label of the target object.

15. The non-transitory computer-readable storage medium according to claim 13, wherein the first association relationships are divided into multiple association relationship types, each association relationship type of the multiple association relationship types corresponding to a portion of the relevant object data; and the determining the second label of the target object according to the first label of the target object, the corresponding annotation labels, the corresponding second labels and the corresponding first association relationships of the plurality of first sample objects as the recognition result of the target object comprises:

obtaining a weight corresponding to each type of association relationship type; and determining the second label of the target object according to the first label of the target object, the annotation label and the second label of the plurality of first sample objects, the association relationship type, and the weight corresponding to the association relationship type.

16. The non-transitory computer-readable storage medium according to claim 13, wherein the method further comprises:

determining, for the plurality of first sample objects, influences of the plurality of first sample objects according to the relevant object data; and the determining the second label of the target object according to the first label of the target object, the corresponding annotation labels, the corresponding second labels and the corresponding first association relationships of the plurality of first sample objects as the recognition result of the target object comprises:

determining the second label of the target object according to the first label of the target object, the annotation label and the second label of each of the plurality of first sample objects, the influences of the plurality of first sample objects, and the first association relationships between the target object and the plurality of first sample objects.

17. The non-transitory computer-readable storage medium according to claim 13, wherein the method further comprises:

determining a proportion of a number of objects of each object type among the target object and the plurality of first sample objects according to the first label of the target object and the annotation label of each of the plurality of first sample objects; and the determining the second label of the target object according to the first label of the target object, the corresponding annotation labels, the corresponding second labels and the corresponding first association relationships of the plurality of first sample objects as the recognition result of the target object comprises:

taking the proportion of the number of objects of each object type as a weight, weighting the first label of the corresponding object type of the target object, and weighting the annotation labels of the corresponding object type of the plurality of first sample objects; and determining the second label of the target object according to the weighted first label of the target object, the weighted annotation label and the weighted second label of each of the plurality of first sample objects, and the first association relationships between the target object and the plurality of first sample objects.

18. The non-transitory computer-readable storage medium according to claim 13, wherein the reference data set is obtained by:

obtaining a second training data set, the second training data set comprising the relevant object data of the plurality of first sample objects with the annotation labels;

determining second association relationships between the plurality of first sample objects in the second training data set according to the relevant object data of plurality of first sample objects; and taking the annotation label of each plurality of first sample objects as an initial third label of the first sample object, repeatedly performing the following operations until updated third labels of the plurality of first sample objects satisfy a preset condition, and determining that the third label of the plurality of first sample objects, when the preset condition is satisfied, is the second label of the first sample object:

obtaining, based on the second association relationships and the annotation labels and third labels of the plurality of first sample objects, updated fourth labels of the plurality of first sample objects by performing label propagation between the plurality of first sample objects; and fusing, for each first sample object of the plurality of first sample objects, the updated fourth labels of the plurality of first sample objects having the second association relationships with the first sample object, to obtain a new third label of the first sample object.

* * * * *